(12) United States Patent
Yach et al.

(10) Patent No.: US 7,873,646 B2
(45) Date of Patent: *Jan. 18, 2011

(54) METHOD FOR MODIFYING NOTIFICATIONS IN AN ELECTRONIC DEVICE

(75) Inventors: David Yach, Waterloo (CA); David Castell, Waterloo (CA); Neil Adams, Waterloo (CA); Michael K. Brown, Kitchener (CA); Ian Patterson, Petersburg (CA)

(73) Assignee: Research In Motion Limited, Waterloo, Ontario (CA)

( * ) Notice: Subject to any disclaimer, the term of this patent is extended or adjusted under 35 U.S.C. 154(b) by 377 days.

This patent is subject to a terminal disclaimer.

(21) Appl. No.: 10/784,979

(22) Filed: Feb. 25, 2004

(65) Prior Publication Data

US 2005/0187896 A1    Aug. 25, 2005

(51) Int. Cl.
G06F 7/00      (2006.01)
G06F 17/30     (2006.01)
(52) U.S. Cl. .................... 707/758; 707/784; 455/412.2
(58) Field of Classification Search ................ 455/418, 455/413, 435.1, 567; 707/102, 758, 999.102
See application file for complete search history.

(56) References Cited

U.S. PATENT DOCUMENTS

| | | | |
|---|---|---|---|
| 5,261,045 A | 11/1993 | Scully et al. | |
| 5,903,845 A | 5/1999 | Buhrmann et al. | |
| 5,973,612 A * | 10/1999 | Deo et al. ................. | 340/7.58 |
| 6,208,996 B1 | 3/2001 | Ben-Shachar et al. | |
| 6,393,272 B1 | 5/2002 | Cannon et al. | |
| 6,418,309 B1 | 7/2002 | Moon et al. | |
| 6,457,062 B1 | 9/2002 | Pivowar et al. | |
| 6,603,969 B1 | 8/2003 | Vuoristo et al. | |
| 6,604,079 B1 | 8/2003 | Ruvolo et al. | |
| 6,633,758 B1 * | 10/2003 | Heinonen et al. ........... | 455/418 |
| 6,662,012 B1 | 12/2003 | Do | |
| 6,731,932 B1 | 5/2004 | Rune et al. | |
| 6,785,868 B1 | 8/2004 | Raff | |
| 6,928,300 B1 * | 8/2005 | Skinner et al. ........... | 455/556.2 |

(Continued)

FOREIGN PATENT DOCUMENTS

EP      0399520      11/1996

(Continued)

OTHER PUBLICATIONS

Olaf Drogehorn et al., "Personalised Applications on Services for a Mobile User", Autonomous Decentralized Systems, 2005, ISADS 2005, Proceedings, [Online] Apr. 4, pp. 473-479, XP002419282.

(Continued)

*Primary Examiner*—Shew-Fen Lin
(74) *Attorney, Agent, or Firm*—Perry + Currier Inc.

(57) ABSTRACT

An embodiment relates to a novel apparatus and method for changing modes of notification in an electronic device. An electronic device includes a calendar application and a variety of other applications such as the message reader application or the daily alarm application. The device is configured to use the calendar application to track whether and how the user is notified of the receipt of an electronic. In one embodiment, the user specifically associates a profile behavior to the calendar entry when the calendar entry is first created.

8 Claims, 30 Drawing Sheets

U.S. PATENT DOCUMENTS

| | | | |
|---|---|---|---|
| 6,990,333 B2* | 1/2006 | Andrew et al. | 455/414.1 |
| 6,999,731 B2* | 2/2006 | Cronin | 455/88 |
| 7,076,275 B1* | 7/2006 | Karstens et al. | 455/567 |
| 7,092,925 B2* | 8/2006 | Na et al. | 706/46 |
| 7,181,689 B2 | 2/2007 | Mock et al. | |
| 7,184,786 B2 | 2/2007 | Mumick et al. | |
| 7,243,130 B2* | 7/2007 | Horvitz et al. | 709/207 |
| 7,248,900 B2* | 7/2007 | Deeds | 455/567 |
| 7,263,353 B2 | 8/2007 | Forsberg et al. | |
| 7,283,831 B2 | 10/2007 | Caldini et al. | |
| 2002/0032040 A1 | 3/2002 | Tsukamoto | |
| 2002/0115429 A1 | 8/2002 | Deluca et al. | |
| 2002/0116541 A1* | 8/2002 | Parker et al. | 709/318 |
| 2002/0136368 A1 | 9/2002 | Aoki et al. | |
| 2002/0142792 A1 | 10/2002 | Martinez | |
| 2002/0165969 A1* | 11/2002 | Gallant | 709/227 |
| 2003/0043765 A1 | 3/2003 | Dawidowsky et al. | |
| 2003/0050982 A1 | 3/2003 | Chang | |
| 2003/0064746 A1 | 4/2003 | Rader et al. | |
| 2003/0131023 A1 | 7/2003 | Bassett et al. | |
| 2003/0143954 A1 | 7/2003 | Dettinger et al. | |
| 2003/0153368 A1 | 8/2003 | Bussan et al. | |
| 2003/0176188 A1 | 9/2003 | O'Neill | |
| 2004/0058718 A1* | 3/2004 | Yu | 455/567 |
| 2004/0082317 A1 | 4/2004 | Graefen | |
| 2004/0086094 A1 | 5/2004 | Bosik et al. | |
| 2004/0127203 A1* | 7/2004 | Markki et al. | 455/418 |
| 2004/0198427 A1* | 10/2004 | Kimbell et al. | 455/556.1 |
| 2004/0203643 A1 | 10/2004 | Bhogal et al. | |
| 2004/0203644 A1 | 10/2004 | Anders et al. | |
| 2004/0203768 A1 | 10/2004 | Ylitalo et al. | |
| 2004/0268270 A1 | 12/2004 | Hill et al. | |
| 2005/0009547 A1 | 1/2005 | Harris et al. | |
| 2005/0079863 A1 | 4/2005 | Macaluso | |
| 2005/0080862 A1 | 4/2005 | Kent | |
| 2005/0096048 A1 | 5/2005 | Clare et al. | |
| 2005/0136903 A1 | 6/2005 | Kashima et al. | |
| 2005/0164704 A1 | 7/2005 | Winsor | |
| 2005/0180362 A1 | 8/2005 | Chin et al. | |
| 2005/0289202 A1 | 12/2005 | S et al. | |
| 2006/0020804 A1 | 1/2006 | Schleifer et al. | |
| 2006/0112427 A1 | 5/2006 | Shahbazi | |
| 2006/0143298 A1 | 6/2006 | Anttila et al. | |
| 2006/0190547 A1 | 8/2006 | Bhogal et al. | |
| 2007/0016646 A1 | 1/2007 | Tendjoukian et al. | |
| 2007/0032225 A1 | 2/2007 | Konicek et al. | |
| 2007/0061712 A1 | 3/2007 | Bodin et al. | |
| 2007/0184858 A1 | 8/2007 | Landschaft et al. | |
| 2007/0275767 A1 | 11/2007 | Steele | |
| 2008/0307323 A1 | 12/2008 | Coffman et al. | |

FOREIGN PATENT DOCUMENTS

| | | |
|---|---|---|
| EP | 1185058 A2 | 3/2002 |
| EP | 1217532 A2 | 6/2002 |
| EP | 1220521 A2 | 7/2002 |
| EP | 1259053 | 11/2002 |
| EP | 1887463 A | 2/2008 |
| WO | 97/47120 A2 | 12/1997 |
| WO | 9747120 A | 12/1997 |
| WO | 00/62201 A | 10/2000 |
| WO | 02/44958 A | 6/2002 |
| WO | 03/026259 A1 | 3/2003 |
| WO | 03056791 | 7/2003 |
| WO | 2005/116892 A | 12/2005 |

OTHER PUBLICATIONS

European Search Report, of Sep. 18, 2008.
Intellectual Property Office of Singapore, Office Action, Dec. 8, 2009.
The Information Technology Department Presents Outlook Tips, vol. 2, Sep. 2002.
Canadian Patent Application No. 2,615,313 Office Action dated Sep. 9, 2010.

* cited by examiner

METHOD FOR MODIFYING NOTIFICATIONS IN AN ELECTRONIC DEVICE

FIELD OF INVENTION

The present application relates generally to electronic devices and more particularly to a method for modifying notifications in an electronic device.

BACKGROUND OF THE INVENTION

Electronic devices can provide a variety of functions including notifying users of various events throughout the day. Electronic devices can include several different types of devices including desktop computers or mobile stations such as simple cell phones, smart telephones, wireless PDAs, and laptops with wireless 802.11 or bluebook chip sets. These devices run on a wide variety of networks from data-only networks such as Mobitex and DataTAC to complex voice and data networks such as GSM/GPRS, CDMA, EDGE, UMTS and W-CDMA networks. Events that can require notification include receiving a telephone call by a cell phone or a regular telephone. Other events can include receiving an e-mail or fax by a chiming of the daily alarm or alarm notifying the user of an upcoming appointment.

Although notifications are useful in alerting users of various events, they can also be a source of constant interruption, annoyance and even embarrassment. Users of devices with notification functions can face constant interruption and distraction as the devices ring or vibrate loudly at inappropriate times and places. For example, cell phones ring loudly in the middle of lectures, exams, movies, meetings, performances or various ceremonies. Such inopportune ringing causes embarrassment for the user of the device, interrupts the event and distracts the other participants. Moreover, in circumstances where there is a live performance, a lecture or an actual person performing a ceremony, the ringing (or any other loud method of notification) distracts the lecturer or the performer and can ruin the event. Another example is the chiming of the notification function on an electronic device during an important meeting, perhaps in the middle of an intense conversation or during court proceedings or cross-examination of witnesses. Once again, the chiming of the notification function can cause embarrassment to the owner of the device, can interrupt the mood of the event and can generally disrupt the entire event.

These problems have become so widespread that organizers of events have started speaking out and some have started taking precautions. For example, most lectures and movie theatres post signs asking people to turn off their cellular phones and personal digital devices. Also, it is not uncommon for the chair of meetings, or the fist speaker of any proceeding to politely remind all participants to turn off their cell phones or other electronic devices.

In an effort to solve this problem, manufacturers have come up with devices that have different modes of notification, such as vibrations and visual alerts, so that users can change the mode of notification if they are attending functions where interruptions are a serious problem. However, these devices fall short of solving the problem of audible notifications in inappropriate times and offer only a limited control for the user to reduce the problem. One of the short comings is that the user has to remember to manually change the method of notification at the right time. Many users do not put their mind to changing the method of notification, until the device goes off in the middle of the event causing the embarrassments, interruptions and distractions described above. Moreover, in an effort to quickly change the method of notification, users may mistakenly choose an even louder or just as distractive mode of notification and do not notice their mistake until the device goes off in the middle of the event, causing the same embarrassments, interruptions and distractions referred to above. The user needs to manually invoke these alternative notification methods each time s/he wants to change the method of notification. Another problem arises because the mode of notification does not get switched back to the "default" mode after the event is over. The user has to remember to turn notification back on to "default mode". Many users forget to turn notification back to the "default mode" and end up missing important appointments, phone calls or voicemails. Further, the user may turn off the device prior to the event, and may forget to turn the device back on, causing notifications to be visible instead of audible. This may have consequences for users that are very dependant on their electronic devices.

SUMMARY OF THE INVENTION

It is an object to provide a novel system, apparatus and method for changing methods of notification that obviates or mitigates at least one of the above-identified disadvantages.

According to one aspect, there is provided a computing device comprising at least one output device which emits notification signals and a microcomputer which processes a first and a second event. The microcomputer instructs the output device to emit notification signals in accordance to a notification mode. The notification mode is derived from at least one (and possibly a set of) criteria associated with at least one of the mentioned first and second events.

The electronic device can be a wireless personal digital assistant, a personal computer, a cell telephone, a smart telephone or any other device that can signal users of the occurrence of events. Signals used to notify users can be audible, mechanical, inaudible, or combinations thereof.

The first event, mentioned above, can be an appointment, in for example, a calendar application, and it can be associated with a predefined notification mode. The second event can be either the receipt of an electronic message or the going off of a daily alarm, each of which the user would normally be notified of by a signal from the device. The electronic device can also include the functionality of a telephone and the second event can also be the receipt of a telephone call, which the user would normally be notified of by a signal from the device. The signal from the device can be in accordance with a notification mode associated with the first event or it can be selected based on a predefined characteristic of the first event such as a string of characters included in the first event. The first and second events can occur in different applications stored on the device and their respective modes of notification can be based on a plurality of profiles configurable for each application.

The microcomputer can be operable to execute a calendar application and a message reader application and the first event can be an appointment in the calendar application and the second event can be a receipt of an email by the message reader application.

One of the criteria that can affect the mode of notification is the physical location that is sensed by the device. For example, the device can be a personal digital assistant and the physical location can be a docking cradle. Furthermore, the device can be a bluetooth device and the physical location can be a proximity to another bluetooth device.

In another aspect there is provided, a method for modifying notifications in an electronic device comprising the steps of, performing a first event, performing a second event during the first event, deriving a notification mode based on at least one criterion associated with at least one of the events, and, generating a signal according to the notification mode.

In yet another aspect, there is provided an electronic device comprising at least one output device for emitting a plurality of different signals, a microcomputer operable to maintain a calendar appointment and operable to receive an electronic message such that when the electronic message is received during the calendar appointment, the microcomputer derives a notification mode associated with the calendar appointment and instructs the output device to emit one of the signals according to the notification mode.

In still another aspect, there is provided a method of modifying notifications in an electronic device comprising the steps of maintaining a calendar appointment, receiving an electronic message during the calendar appointment, deriving a notification mode associated with the calendar appointment and generating a signal according to the notification mode.

BRIEF DESCRIPTION OF THE DRAWINGS

Certain embodiments will now be described, by way of example only, with reference to the attached figures, wherein.

DETAILED DESCRIPTION OF THE INVENTION

Figure 1:
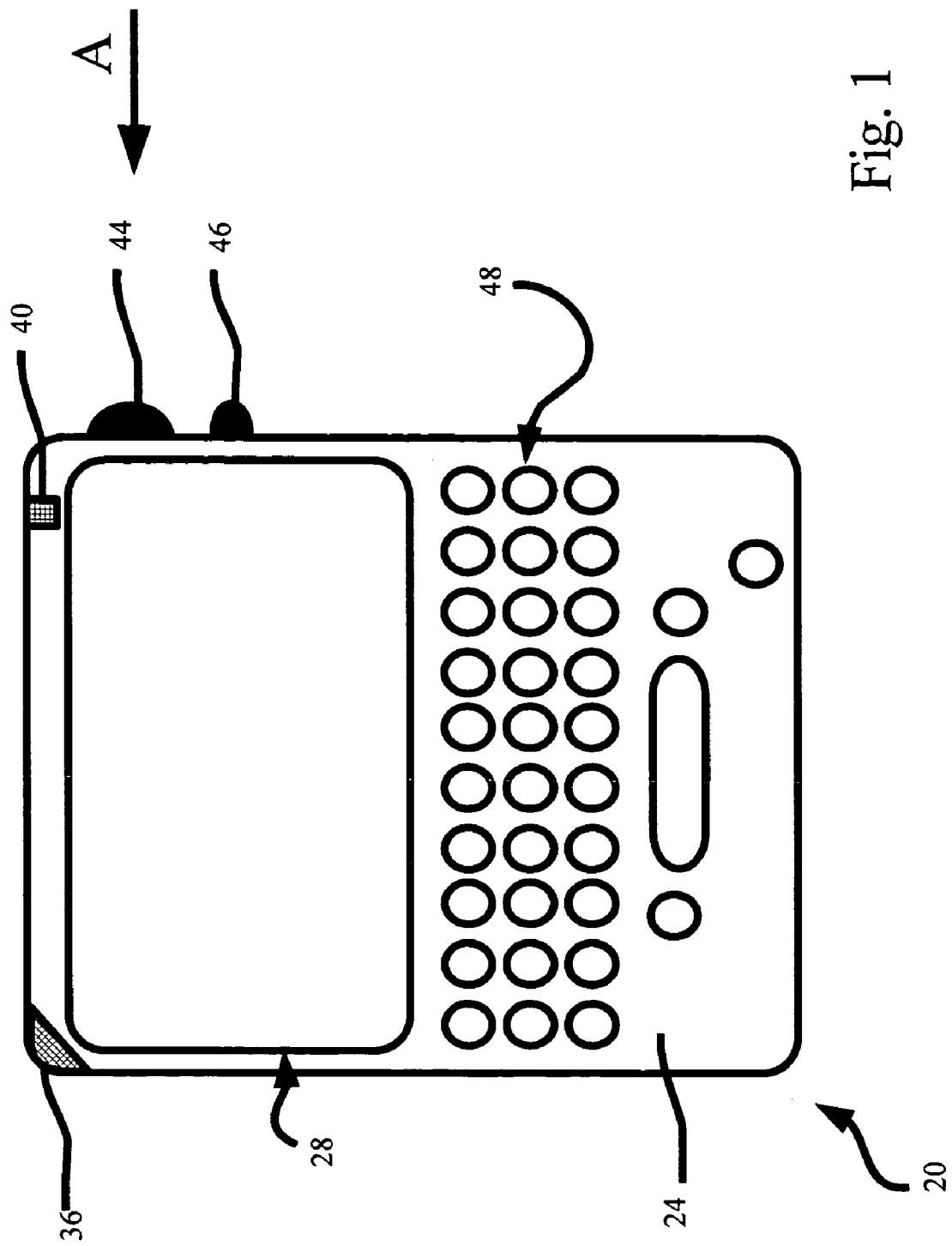
FIG. 1 is a schematic representation of an electronic device for modifying notifications in accordance with an embodiment.

Referring to FIG. 1, an electronic device for modifying notifications, in accordance with an embodiment is indicated generally at 20. In this embodiment, electronic device 20, is based on the computing environment and functionality of a wireless personal digital assistant. It is, however, to be understood that electronic device 20 can include the construction and functionality of other electronic devices, such as desktop computers, cell phones, smart telephones, and laptops with wireless 802.11 or bluebook chip sets and the like. In one embodiment, electronic device 20 includes, a housing 24, which frames an LCD display 28, a speaker 36, an LED indicator 40, a trackwheel 44, an exit key 46 and key pad 48. Trackwheel 44 and exit key 46 can be inwardly depressed along the path of arrow "A" as a means to provide additional user-input. It will be understood that housing 24, can be made from any suitable material as will occur to those of skill in the art.

Figure 2:
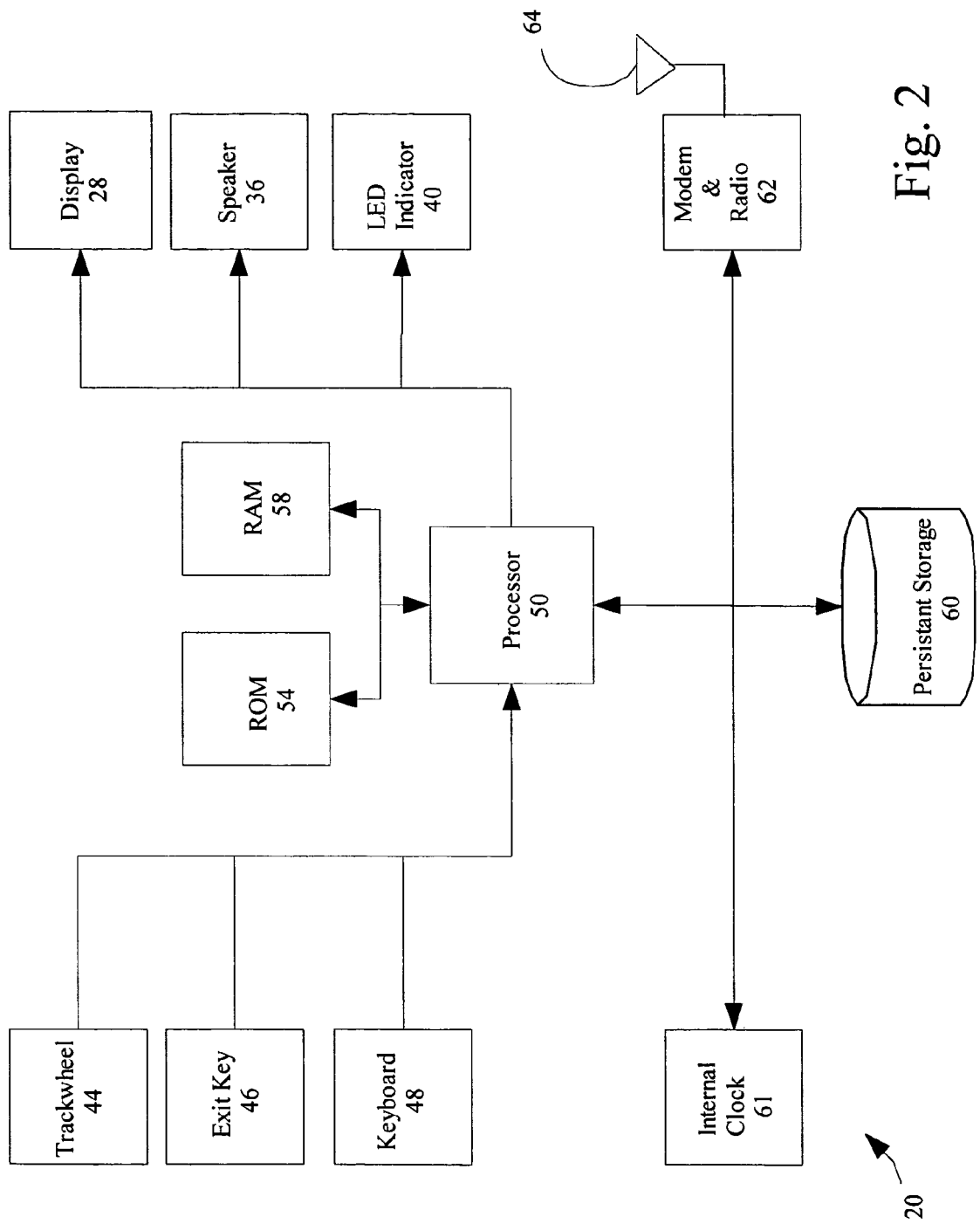
FIG. 2 is a block diagram of certain internal components within the device in FIG. 1.

Referring now to FIG. 2, a block diagram of certain internal components within device 20 are shown. Device 20 is based on a microcomputer that includes a processor 50 that is connected to a read-only-memory ("ROM") 54, which contains a plurality of applications executable by processor 50 that enables device 20 to perform certain functions. Processor 50 is also connected to a random access memory unit ("RAM") 58 and a persistent storage 60 which are responsible for various nonvolatile storage functions of device 20. Processor 50 can send output signals to various output devices including display 28, speaker 36, LED indicator 40, each of which generate specific outputs as instructed by processor 50. Processor 50, can also receive input from various input devices including trackwheel 44, exit key 46 and keyboard 48. Processor 50 is also connected to an internal clock 61 and a modem and radio 62 (not shown). Modem and radio 62 can be connected to various wireless networks through an antenna 64.

Figure 3:
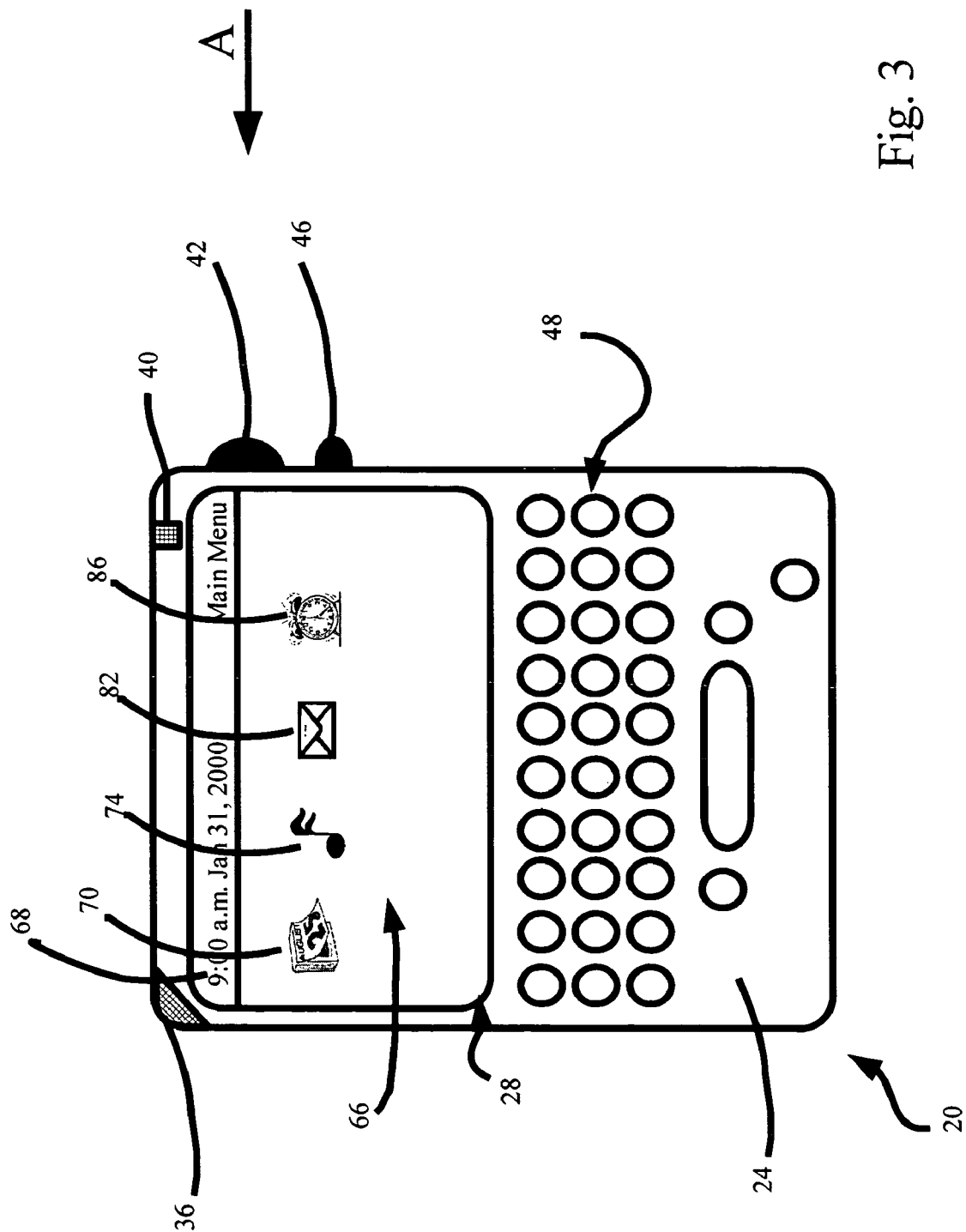
FIG. 3 shows the device of FIG. 1 with the main menu screen displaying a plurality of applications including a calendar, a notification setup, a message reader and a daily alarm.

Device 20 is operable to execute various applications stored in ROM 54. Referring now to FIG. 3, device 20 is shown with a main menu screen 66, that displays a system clock 68 which is updated according to internal clock 61 (not shown). Main menu screen 66 also displays a plurality of applications that are executable on processor 50. In one embodiment, such displayed applications include a calendar 70, a notification setup 74, a message reader 82, a daily alarm 86. When executed on processor 50, these applications cause device 20 to operate in various ways, as will be discussed further below. Trackwheel 44 can be used to scroll through the applications and to select a desired application by pressing inwardly, along the path of arrow A, on trackwheel 44. Exit key 46 can be used to exit any application by pressing inwardly, along the path of arrow A, on exit key 46.

Figure 4:
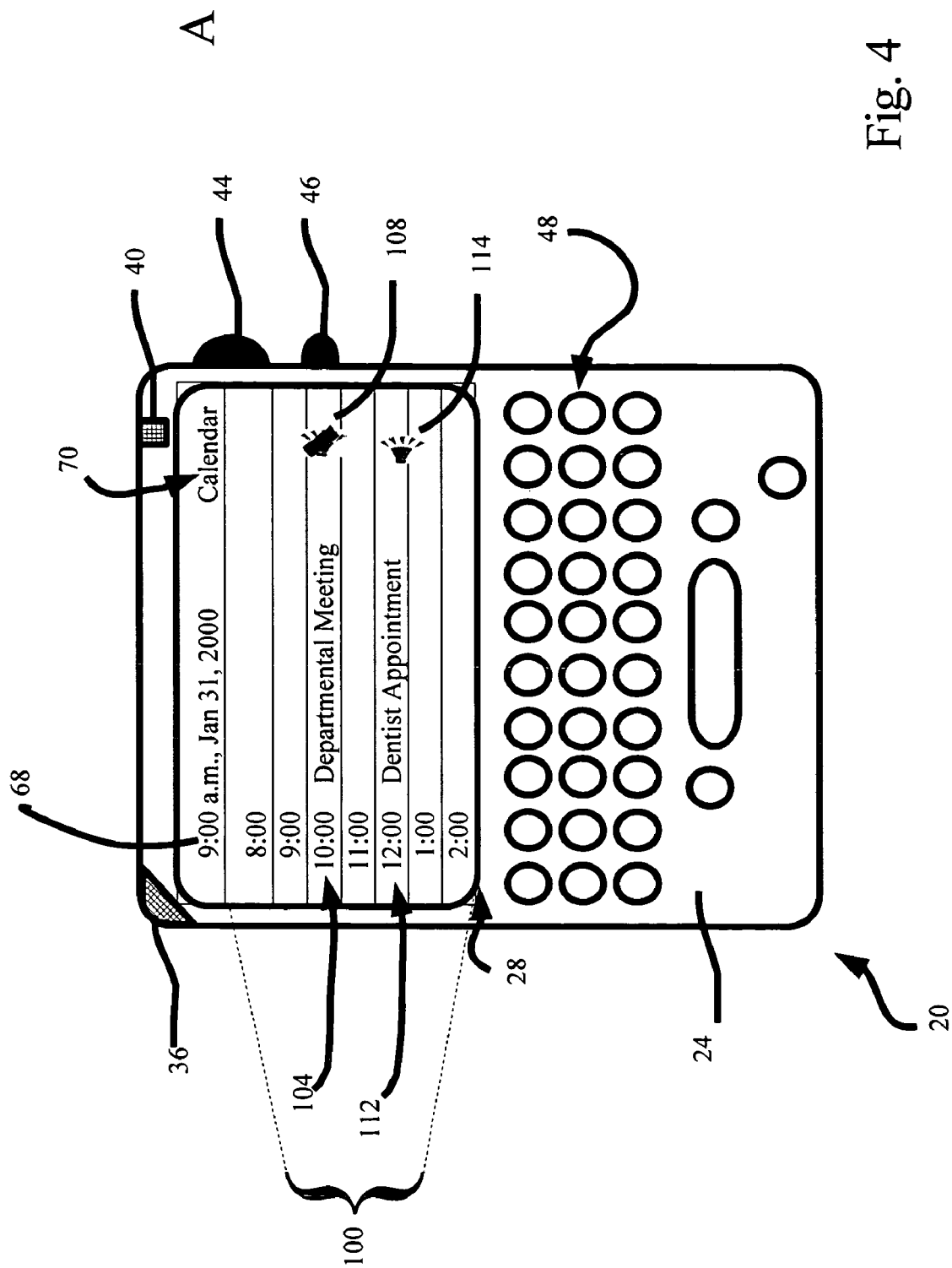
FIG. 4 shows the device of FIG. 1 with the calendar application displaying a plurality of individual appointments for the date of Jan. 31, 2000.

Referring now to FIG. 4, device 20 is shown displaying the day's schedule 100 for Jan. 31, 2000 using the application called calendar 70 on display 28. Schedule 100 includes a plurality of individual appointments 104 and 112. As illustrated in FIG. 4, appointment 104 is a departmental meeting, from 10:00-11:00 a.m., and appointment 112 is a dentist appointment, from 12:00-1:00 p.m. Appointment 104 has a "no-speaker" icon 108 associated with it, while appointment 112 has a speaker icon 114 associated with it. Speaker icon 114 and "no-speaker" icon 108 will be discussed in greater detail below. Calendar 70 also displays a clock 68 that shows the current date and time according to internal clock 61 maintained in device 20.

Figure 5:
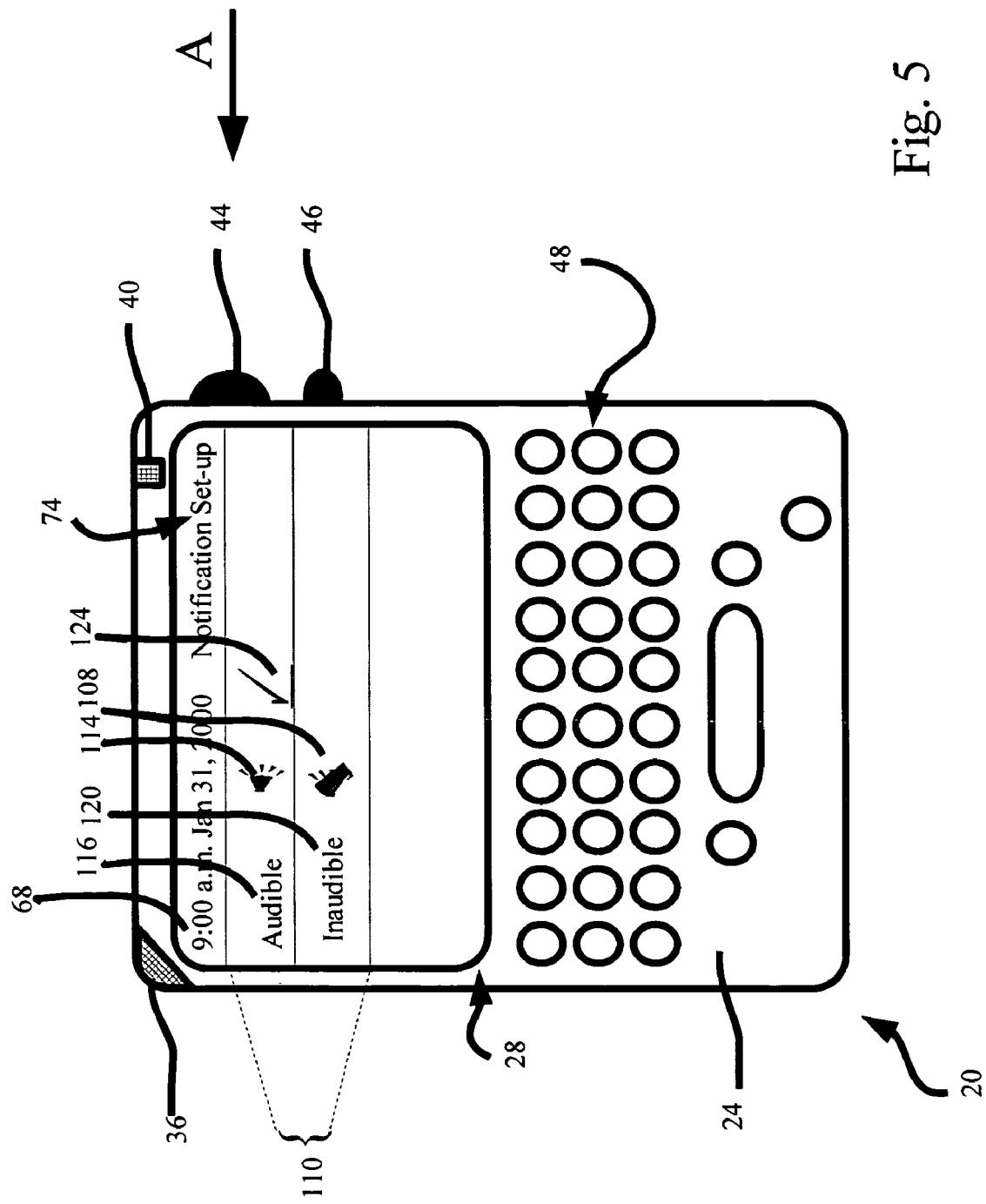
FIG. 5 shows the device of FIG. 1 with the notification setup application displaying a plurality of default modes of notification.

Referring now to FIG. 5, device 20 is shown displaying the default modes of notification 110 using the application called notification setup 74 on display 28, comprising an audible mode 116 and an inaudible mode 120. Audible mode 116 is also associated with speaker icon 114 and inaudible mode 120 is also associated with "no-speaker" icon 108. As shown in FIG. 5, there is a "check-mark" 124 beside speaker icon 114, indicating that the default mode of notification for the present example is audible mode 116. Using trackwheel 44, check-mark 124 can also be placed beside "no-speaker" icon 108, indicating that the default mode of notification is inaudible mode 120.

Figure 6:
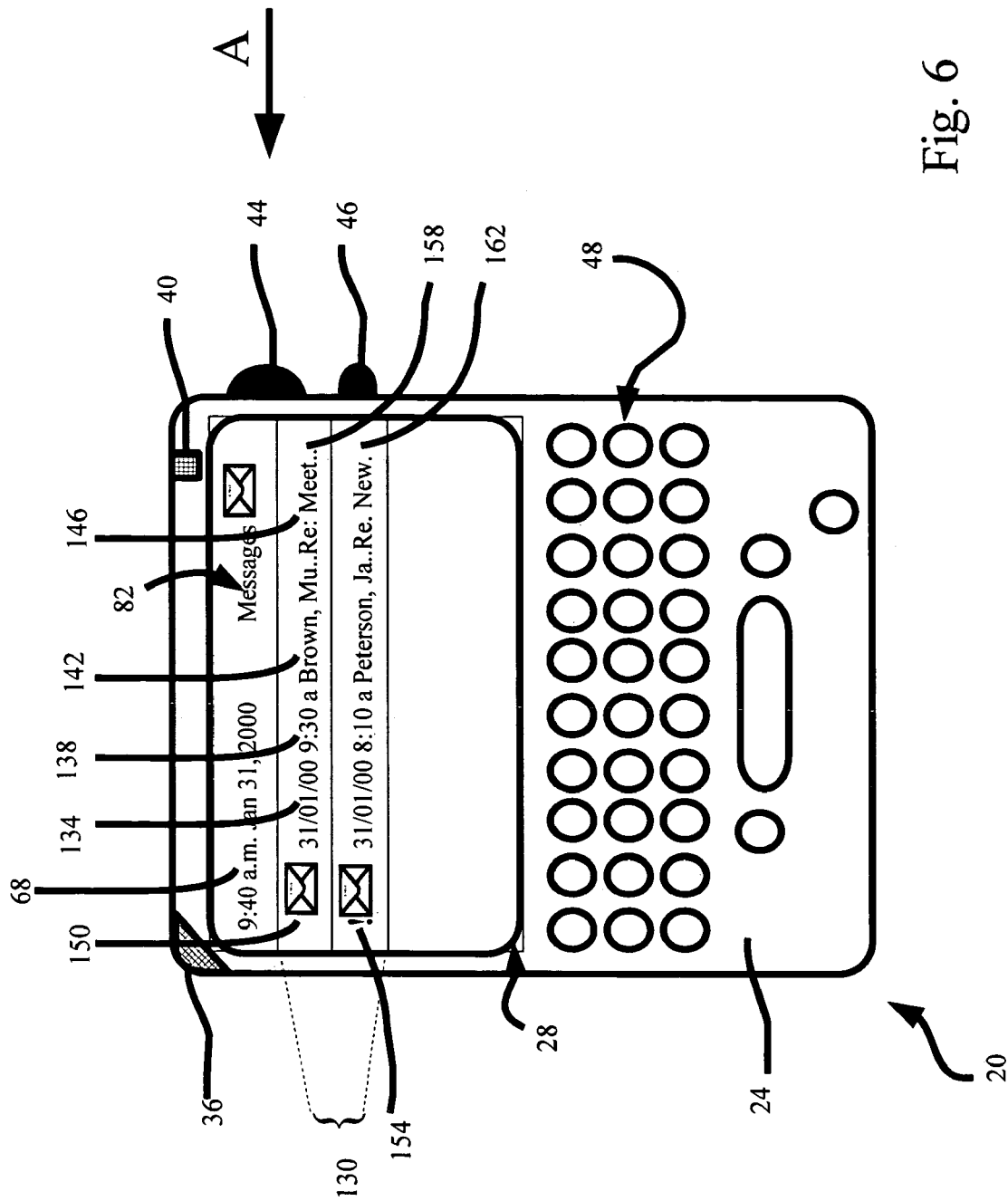
FIG. 6 shows the device of FIG. 1 with the message reader application displaying a plurality of emails received.

Referring now to FIG. 6, device 20 is shown displaying a plurality of emails 130 using the application called message reader 82 on display 28. Emails 130 are received through a wireless network (not shown), that connects to device 20 via modem and radio 62 through antenna 64. Emails 130 have a series of information association with them, including, date of receipt 134, time of receipt 138, name of sender 142, subject line 146, and an envelope icon 150, that can be either opened or closed, indicating whether the email has been opened. Each email 130 can also have an exclamation mark 154 associated with it, indicating that the message is marked urgent by the sender. Trackwheel 44 can be used to scroll through individual emails 130, and inwardly depressed to open each individual email 130. Exit key 46 can be inwardly depressed to exit each individual email. For example in FIG. 6, it is shown that email 158 sent by Murphy Brown, at 9:30 a.m. on Jan. 31, 2000, is not marked urgent, has the subject line: "Re.: Meeting" and has not been opened. Similarly, email 162 sent by Jason Peterson at 8:10 a.m., is marked urgent, has the subject line: "New File" and has not been opened. Message reader 82 also includes clock 68, which functions as previously described in relation to calendar 70.

Figure 7:
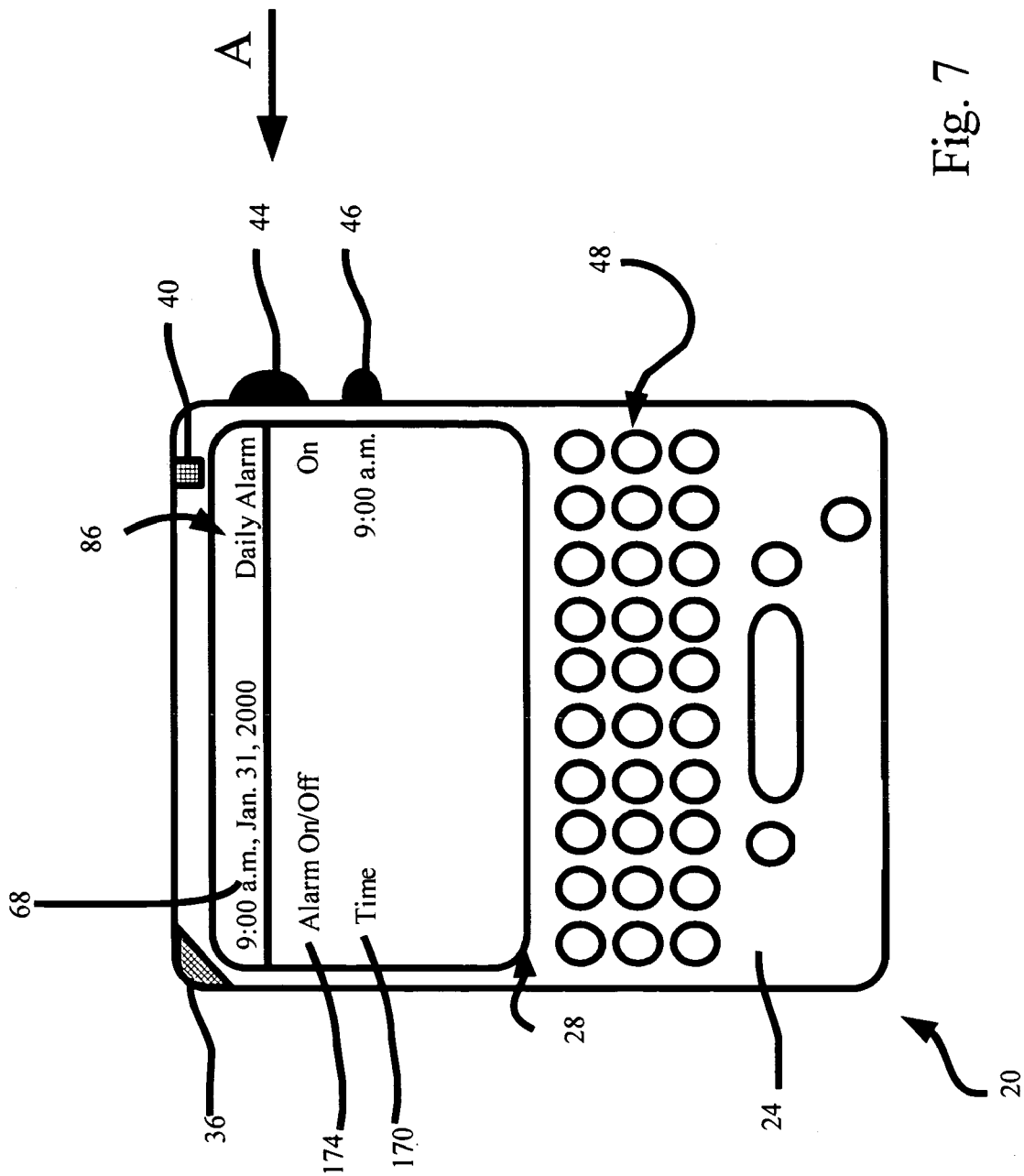
FIG. 7 shows the device of FIG. 1 with the daily alarm application displaying a designated time and an ON/OFF setting for the alarm.

Referring now to FIG. 7, device 20 is shown displaying a designated "Time" 170 and an "ON/OFF" setting 174 using the application called daily alarm 86 in display 28. As seen in FIG. 7, "Time" 170 is associated with a specific time of the day and "ON/OFF" setting 174 can be either on or off. Accordingly, at 9:00 a.m. each day, an alarm will be generated by device 20 as shown in FIG. 7. The operation of alarm 86 will be discussed further in detail below.

A method for modifying notifications in accordance with another embodiment will now be discussed with reference to the flow chart shown in FIG. 8 and is indicated generally at 500. In order to assist in the explanation of method 500, reference will be made to the foregoing discussion of device 20. In order to further assist in the explanation of method 500, the sequence of steps in method 500 shall be followed in connection to a series of examples using device 20. In these examples, it will be assumed that device 20 receives a series of emails at different times during the day.

Figure 8:
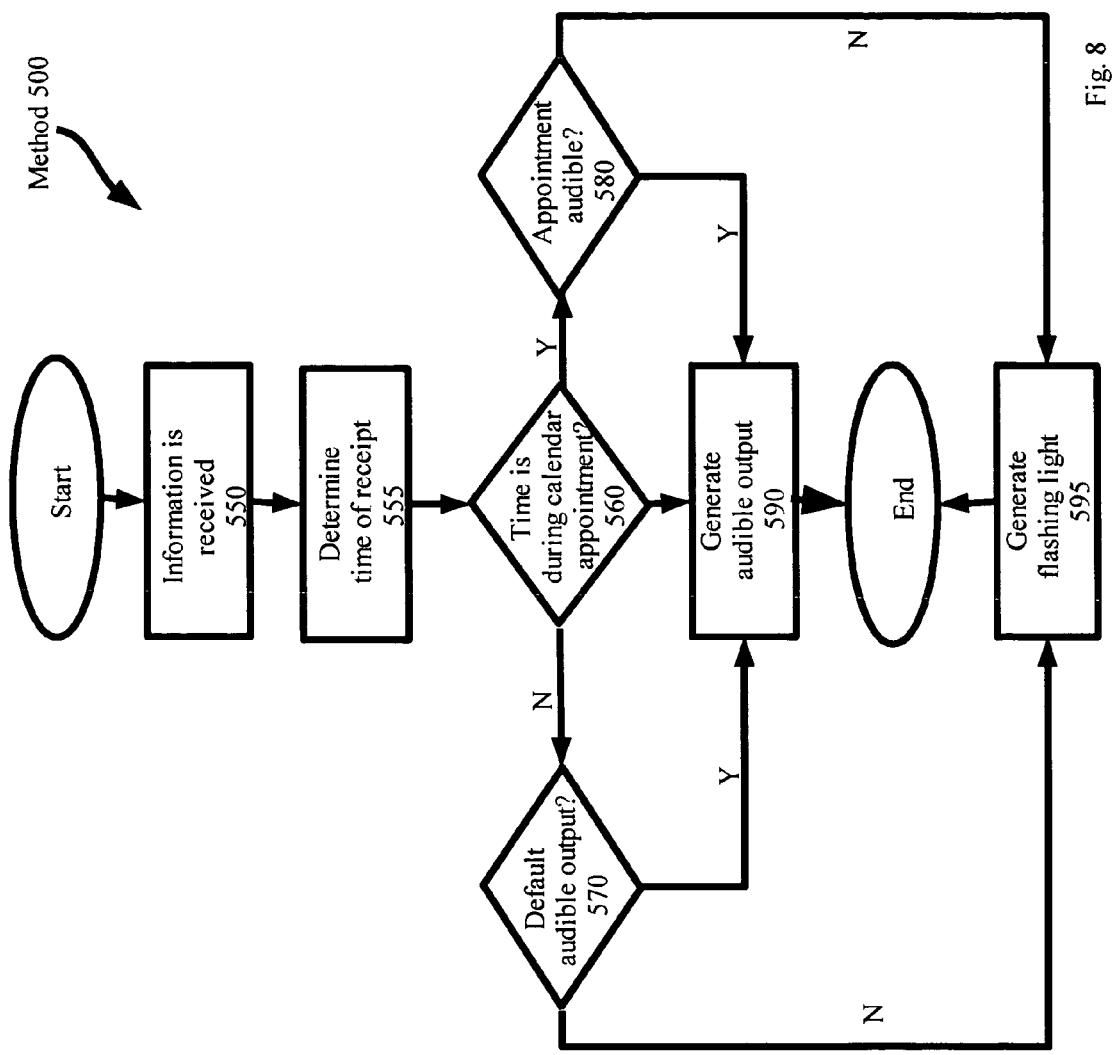
FIG. 8 shows a flow chart depicting a method for modifying notification settings in accordance with another embodiment.
Figure 9:
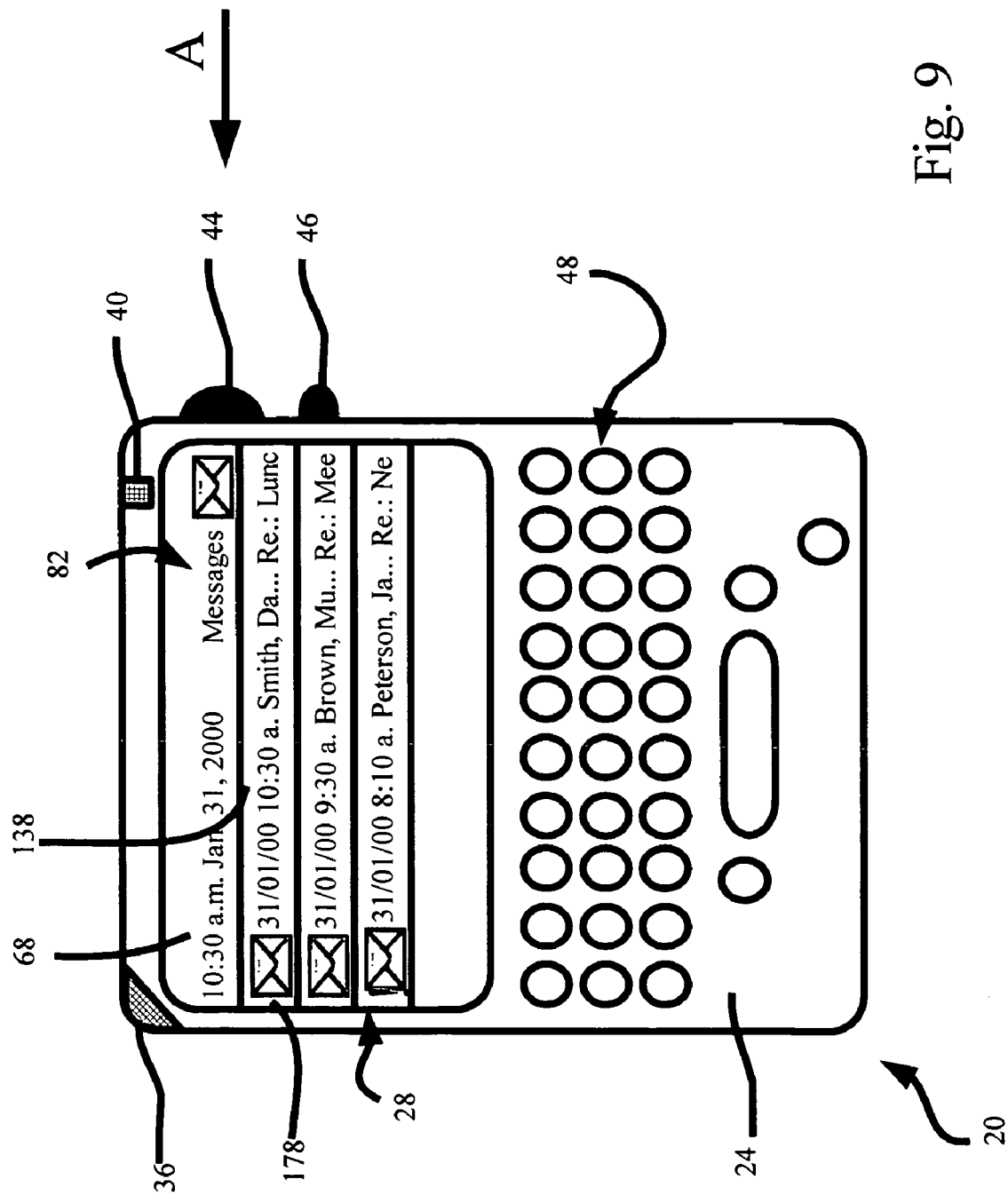
FIG. 9 shows the device of FIG. 1 with the message reader application having received a new email at 10:30 a.m. on Jan. 31, 2000.
Figure 10:
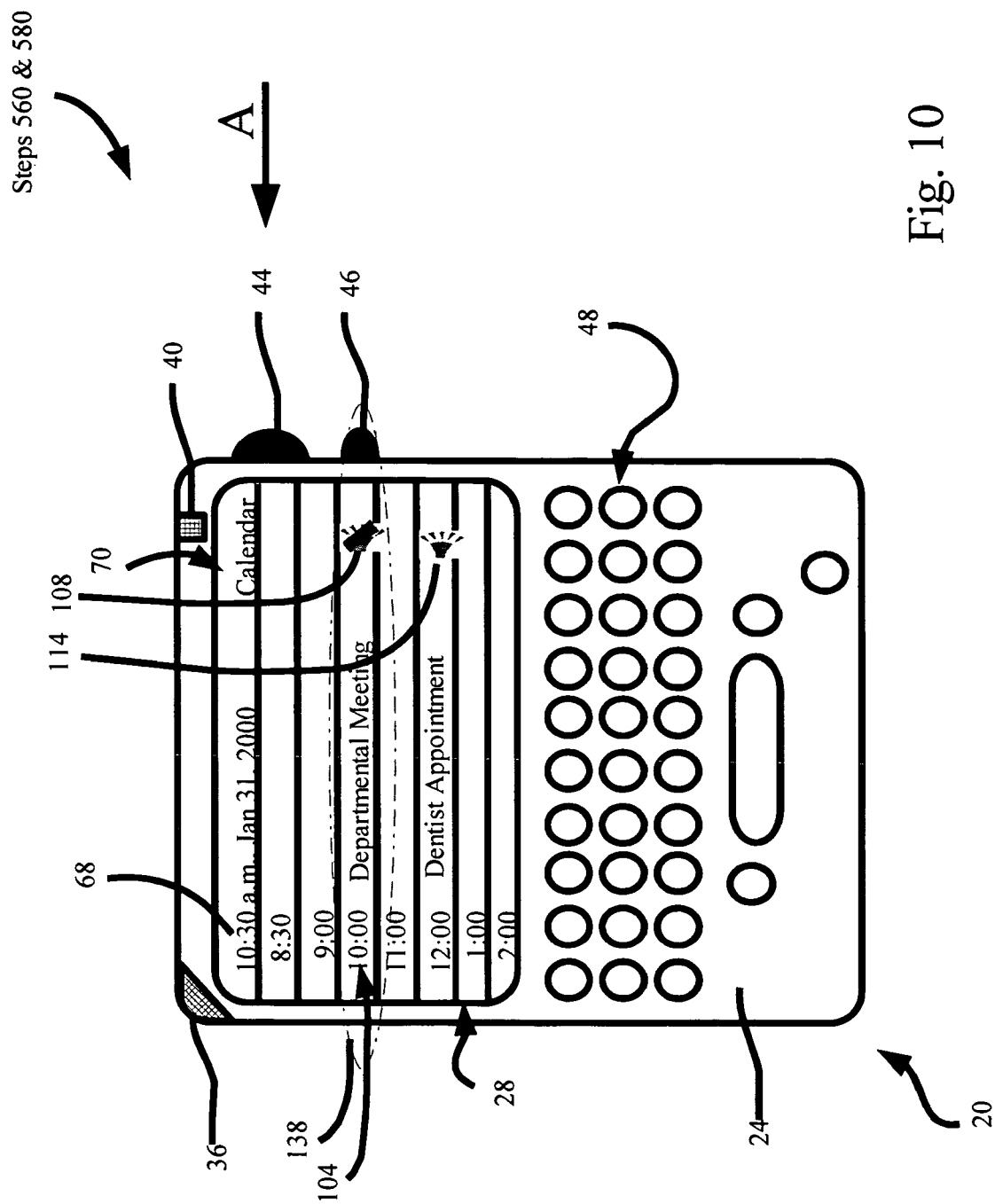
FIG. 10 shows the device of FIG. 1 with the calendar application, showing that at 10:30 a.m. on Jan. 31, 2000, the user of the device is in a departmental meeting.
Figure 11:
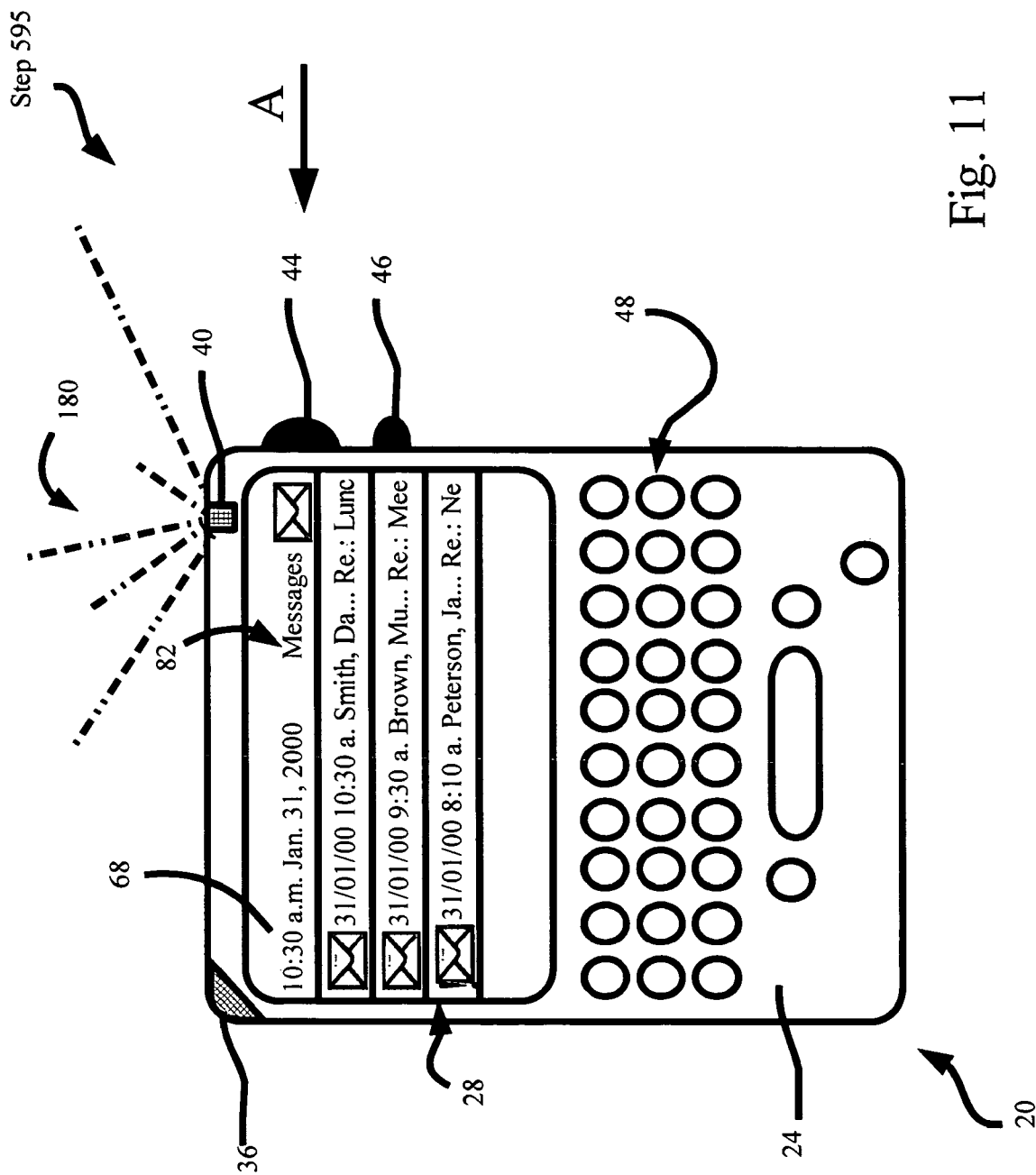
FIG. 11 shows the device of FIG. 1 with the message reader application notifying the receipt of the email in FIG. 9 by a flashing light from the LED indicator.

As demonstrated in the flow chart in FIG. 8, information is received by device 20 at step 550. In the case of the present example, and referring now to FIG. 9, it is to be assumed that the information received is an email and that the email received by device 20 at this step is email 178. Email 178 from David Smith, is received at 10:30 a.m. on Jan. 31, 2000 and is not marked urgent. At step 555, the time of receipt 138 of the information is determined. Referring to FIG. 9, time of receipt 138 of email 178, is determined to be 10:30 a.m. At this point, the method advances to step 560 where it is determined whether time of receipt 138 is during any of appointments marked in calendar 70. If time of receipt 138 is during one of such appointments, the method then advances to step 580. However, if time of receipt 138 is not during any of these times, the method advances to step 570. In connection with email 178, and referring now to FIG. 10, it is determined that time of receipt 138 is during appointment 104 and the method, advances to step 580. At step 580, it is determined whether the appointment with which time of receipt 138 is associated is designated as audible or inaudible. If the appointment with which time of receipt 138 is associated with has speaker icon 114 associated with it, then the method proceeds to step 590 and an audible sound will emanate from speaker 36. If however, the appointment with which time of receipt 138 is associated with has "no-speaker" icon 108 associated with it, then the method proceeds to step 595 and a flashing light 180 will emanate from LED indicator 40. In the case of email 178, since appointment 104 is associated with "no-speaker" icon 108, the method advances to step 595 and referring now to FIG. 11, flashing light 180 will emanate from LED indicator 40. At this point method 500 ends. There may be a variety of ways to cancel the output from LED indicator 40 by, for example, using exit key 46 and pressing inward on exit key 46 along arrow A.

Figure 12:
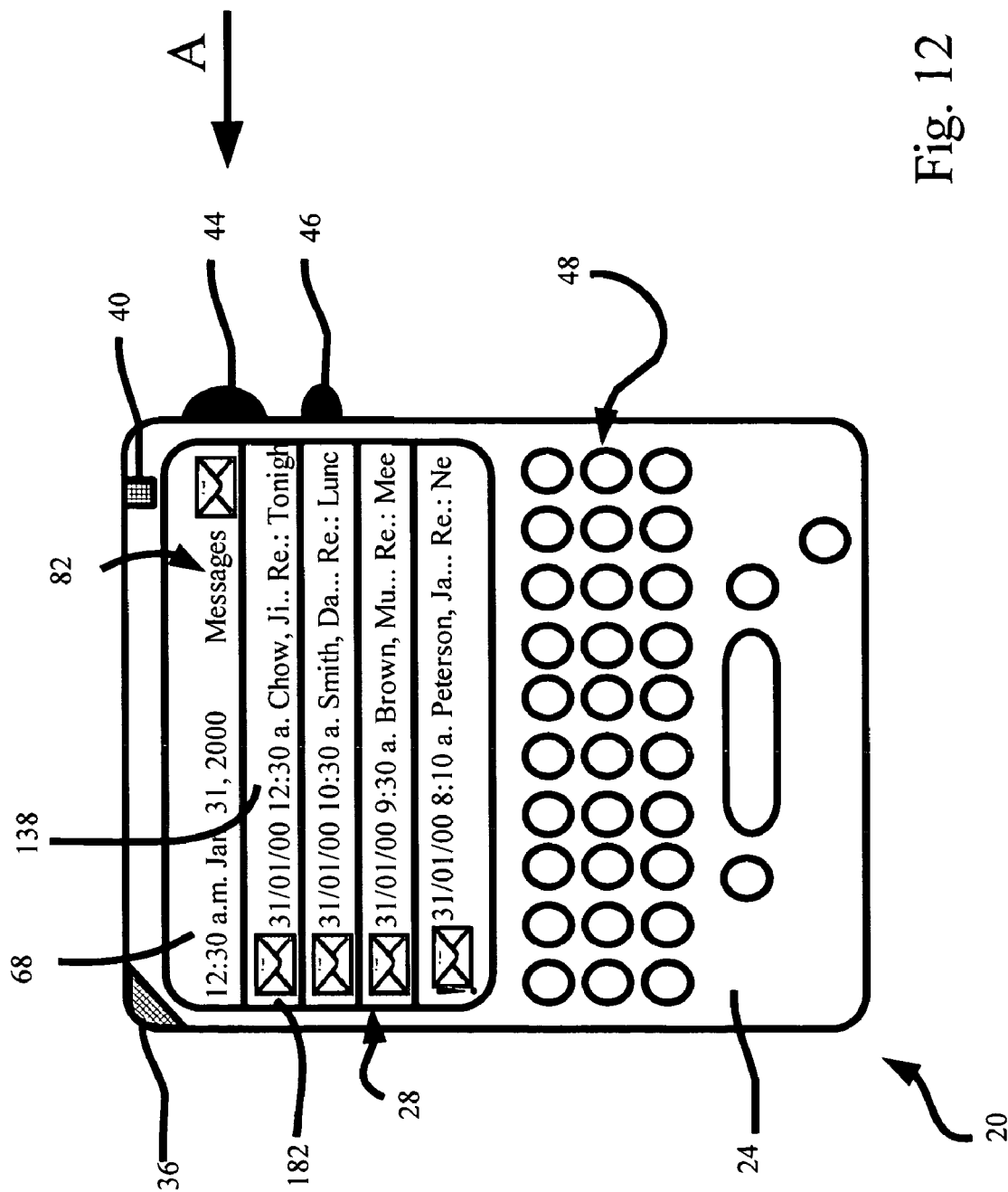
FIG. 12 shows the device of FIG. 1 with the message reader application receiving a new email at 12:30 p.m. on Jan. 31, 2000.
Figure 13:
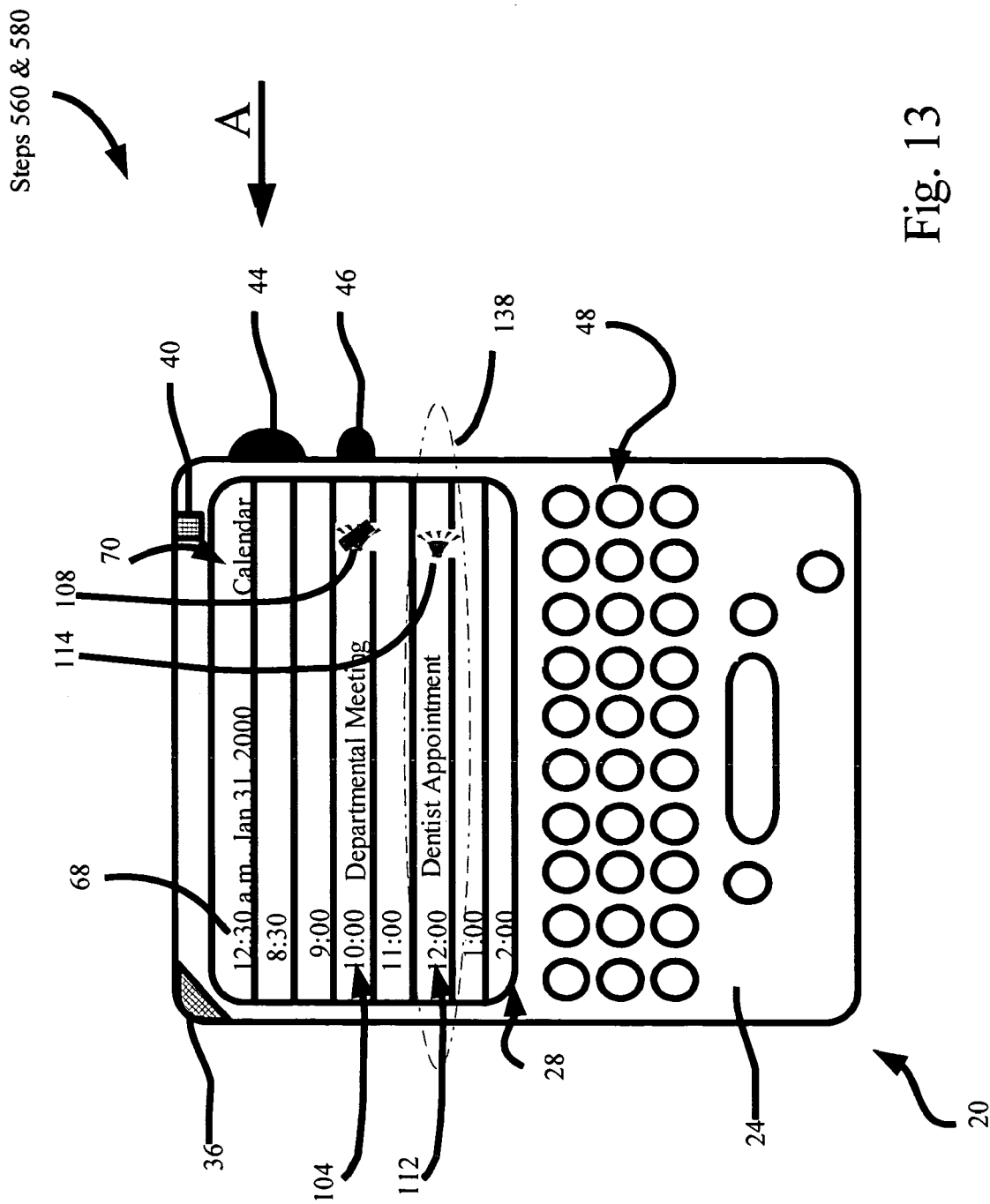
FIG. 13 shows the device of FIG. 1 with the calendar application, showing that at 12:30 p.m. on Jan. 31, 2000, the user of the device is in the middle of a dentist appointment.
Figure 14:
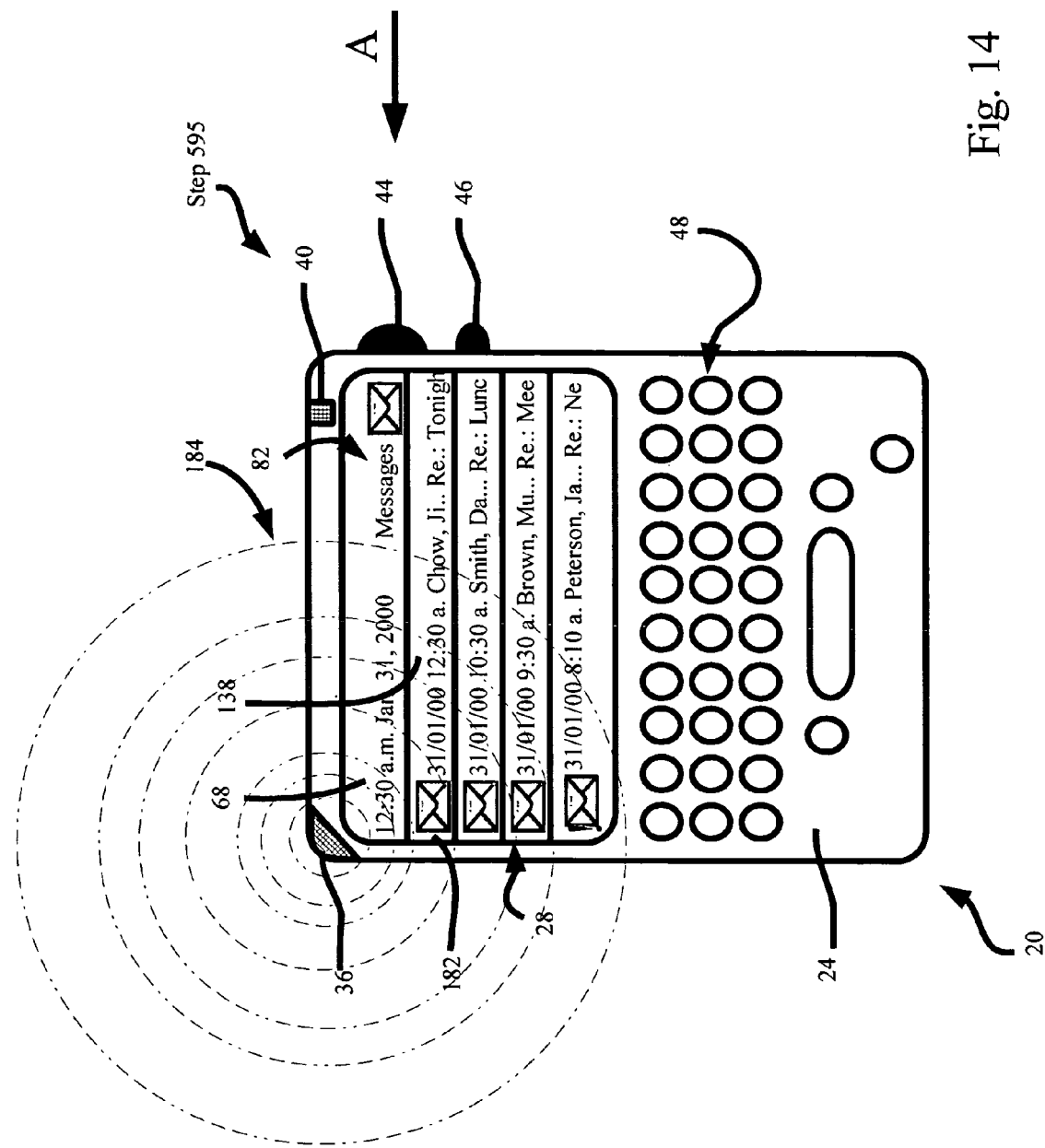
FIG. 14 shows the device of FIG. 1 with message reader application notifying the receipt of the email in FIG. 12 by producing a sound from the speaker.

To further illustrate method 500, an additional example is helpful. Let us assume that device 20 receives another email 182 at 12:30 p.m., as shown in FIG. 12. Following the steps of method 500 outlined above, at step 555, time of receipt 138 is determined to be 12:30 p.m. At step 560, and referring now to FIG. 13, it would be determined that time of receipt 138 is during appointment 112 and hence method 500 proceeds to step 580. At step 580, and still referring to FIG. 13, it will be determined that appointment 112 is associated with speaker icon 114. Hence the method proceeds to step 590, and as illustrated in FIG. 14, a sound 184 emanates from speaker 36. Method 500 ends. Similar to the example above, there may be a variety of ways to cancel the output from speaker 36 by, for example, using exit key 46 and pressing inward on exit key 46 along arrow A.

Figure 15:
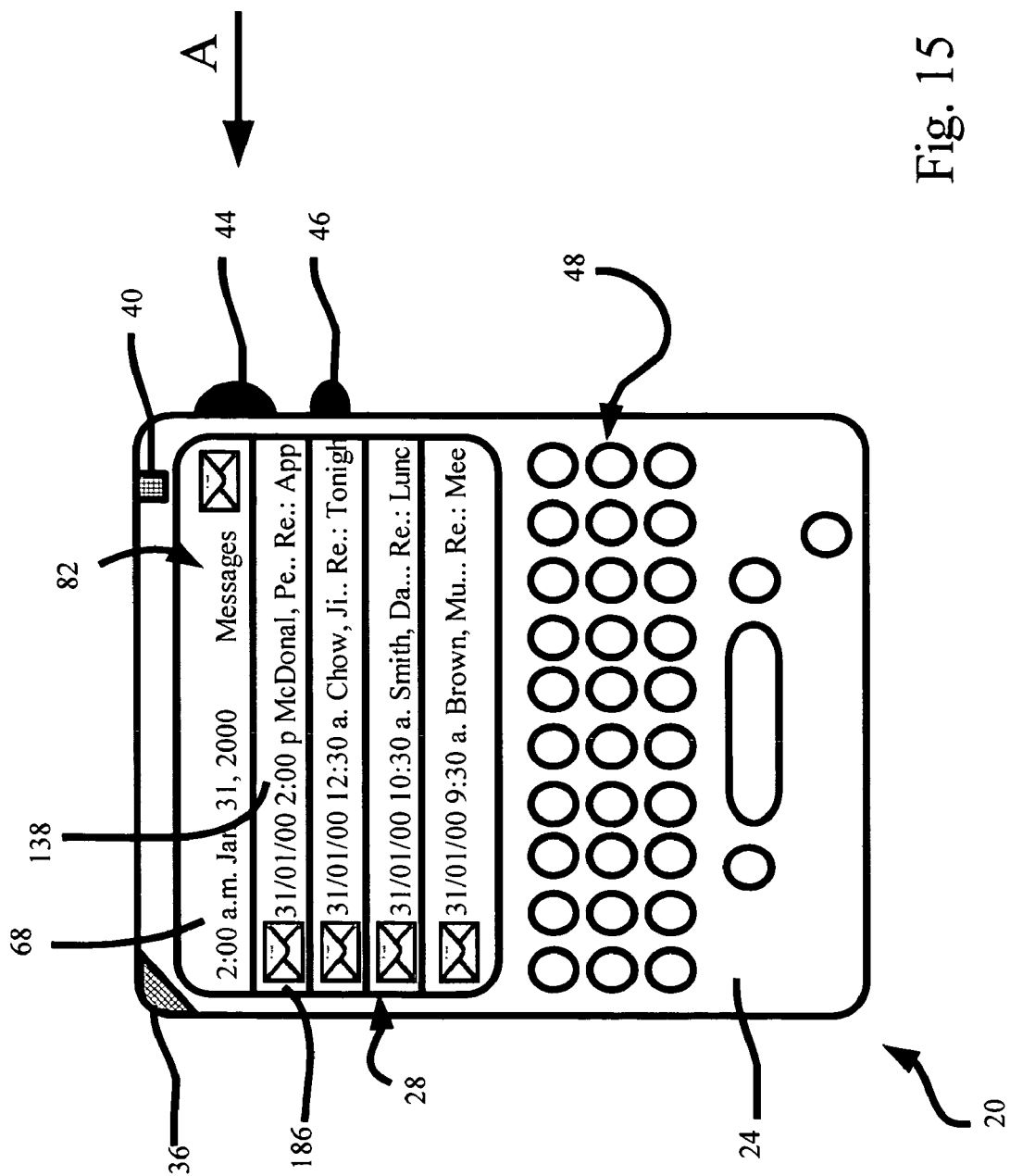
FIG. 15 shows the device of FIG. 1 with the message reader application receiving a new email at 2:00 p.m. on Jan. 31, 2000.
Figure 16:
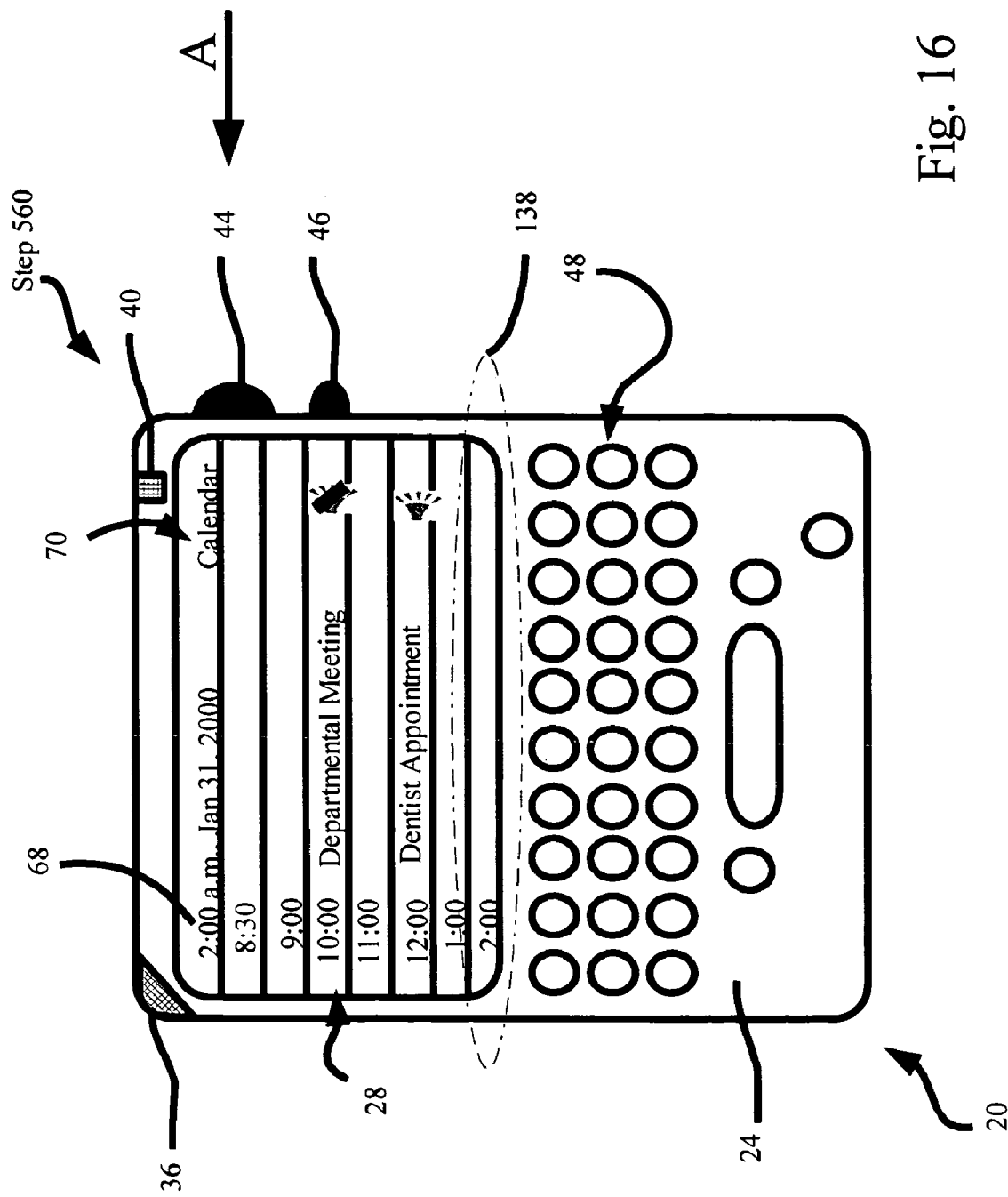
FIG. 16 shows the device of FIG. 1 with the calendar application, showing that at 2:00 p.m. on Jan. 31, 2000, the user of the device does not have any appointments scheduled.

To help even further in illustrating method 500, it will be assumed that device 20 receives yet another email 186 at 2:00 p.m., as shown in FIG. 15. As demonstrated in the flow chart in FIG. 8, information is received by device 20 at step 550. In the case of the present example, and referring now to FIG. 15, the information received is email 186. At step 555, the time of receipt 138 of the information is determined. Referring now to FIG. 15, time of receipt 138 of email 186, is determined to be 2:00 p.m. At this point, method 500 advances to step 560 where it is determined whether time of receipt 138 is during any of appointments marked in calendar 70. If time of receipt 138 is during one of such appointments, the method then advances to step 580. If, however, time of receipt 138 is not during any of these times, the method advances to step 570. In connection with email 186, and referring now to FIG. 16, it is determined that time of receipt 138 is not during any of the appointments in calendar 70 and the method advances to step 570. At step 570, the default notification in notification setup 74 is determined. If the mode of notification is set to audible mode 116, the method would proceed to step 590 and sound 184 would emanate from speaker 36. If, on the other hand, the mode of notification was set to inaudible mode 120, the method would proceed to step 595 and flashing light 180 would emanate from LED indicator 40. For the purposes of the example with email 186, it is assumed that notification setup 74 is configured as shown in FIG. 5. Referring back to FIG. 5, because checkmark 124 is associated with audible mode 116 the default mode of notification is audible. The method, thus, proceeds to step 590 and sound 184 emanates from speaker 36.

Although, in the above examples, the information received at step 550 of method 500 were incoming emails 178, 182 and 186, it will be understood that information received at step 550 could be any type of information including an alarm from daily alarm 86. If for example, "Time" 170 was set to a time during appointment 104, light 180 would emanate from LED indicator 40. Similarly if, "Time" 170 was set to a time during appointment 112, sound 184 would emanate from speaker 36 and if, "Time" 170 was set to a time outside of either appointments 104 or 112, sound 184 would emanate from speaker 36.

Figure 17:
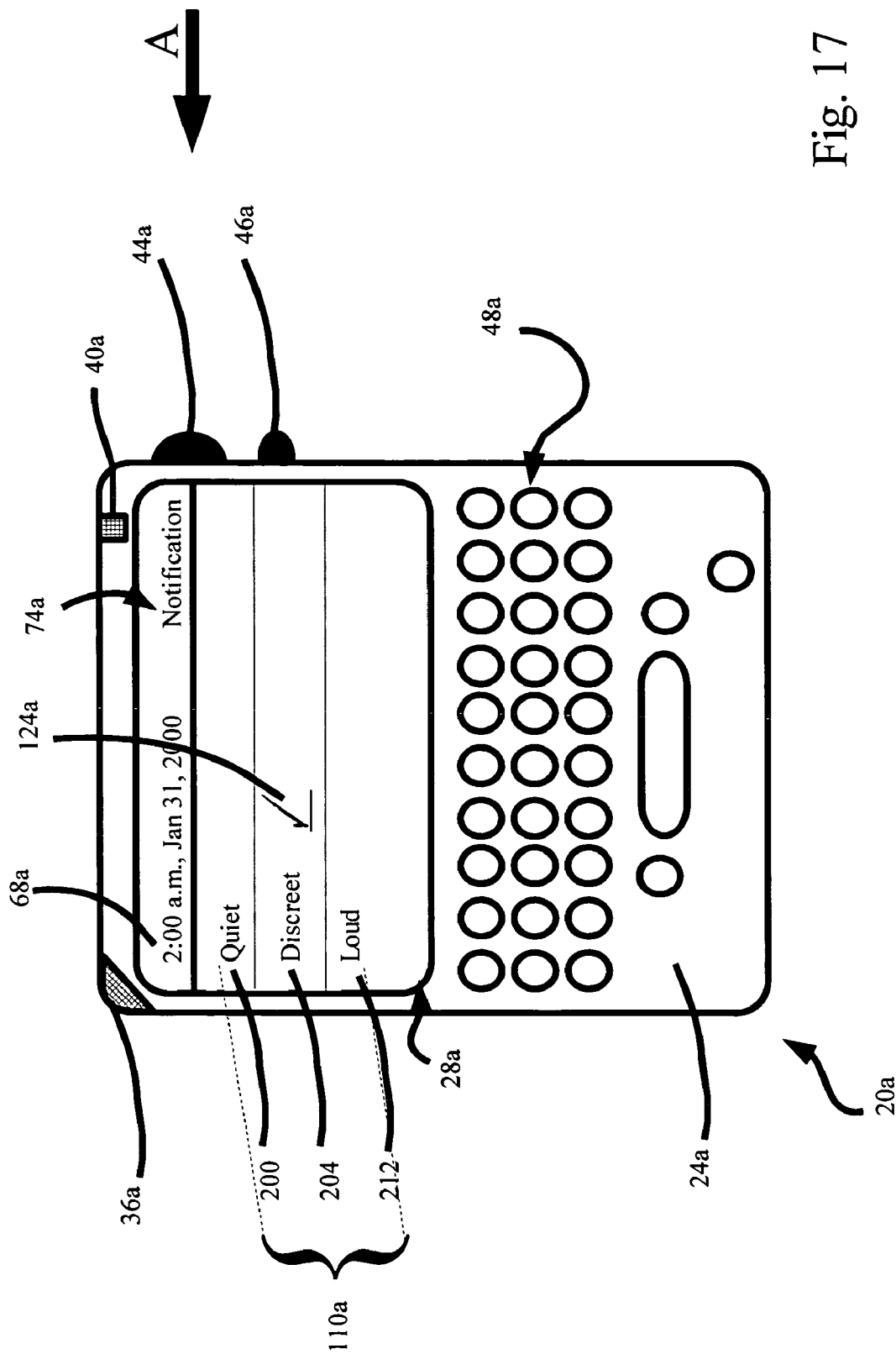
FIG. 17 is a schematic representation of another embodiment with the notification setup application displaying a plurality of methods of notification.

Referring now to FIG. 17, an electronic device for modifying notifications in accordance with another embodiment is indicated generally at 20a. Device 20a is substantially the same as device 20 and like elements of device 20a bear the same reference characters, but followed by the suffix "a". Device 20a is shown in FIG. 17 displaying different notification profiles 110a using the application called notification setup 74a. However, unlike notification setup 74 where the only choices for notification were audible and inaudible, notification setup 74a, allows users to customize their methods of notification. Notification setup 74a comprises a plurality of notification profiles 110a, which in the present embodiment have been labeled Quiet 200, Discreet 204, and Loud 212. Each of these profiles 110a can be customized by the manufacturer or by the user according to user preference. Profiles 10a can also be deleted and additional profiles can be added as desired. Table I shows how each profile 110a can be customized.

TABLE I

An Example of Customizing Methods of Notification

| Mode of Notification (Profiles 110a) | Application | Notification Behavior |
|---|---|---|
| Quiet 200 | Message Reader | Type: Inaudible<br>Tune: None<br>Volume: Mute |
|  | Daily Alarm | Type: Audible<br>Tune: Ring 2<br>Volume: Low |
| Discreet 204 | Message Reader | Type: Audible & Inaudible<br>Tune: Ring 3<br>Volume: Medium |
|  | Daily Alarm | Type: Audible<br>Tune: Ring 1<br>Volume: Low |
| Loud 212 | Message Reader | Type: Audible<br>Tune: Ring 5<br>Volume: High |
|  | Daily Alarm | Type: Audible<br>Tune: Ring 6<br>Volume: High |

Referring now to FIG. 17, checkmark 124a, located beside the profile Discreet 204, indicates that the default mode of notification for the present example is Discreet 204. Trackwheel 44a can be used to scroll through the different profiles 110a and to select a particular profile 110a. Notification setup 24a can also be used to customize each profile 110a.

As illustrated in Table I, each profile can give rise to a different notification output for various applications on device 20a, and notification behavior can be customized according to a variety of criteria, such as "type", "tune" and "volume". "Type" can be either audible or inaudible. Audible means a sound emanating from speaker 36a and inaudible means a light flashing from LED indicator 40a. "Tune" can be any tune chosen by the manufacturer or the user and programmed into device 20a. This is the tune that would be played by speaker 36a when "type" is set to audible. "Volume" determines the volume of the tune and in the present embodiment can be low, medium or high.

Figure 17A:
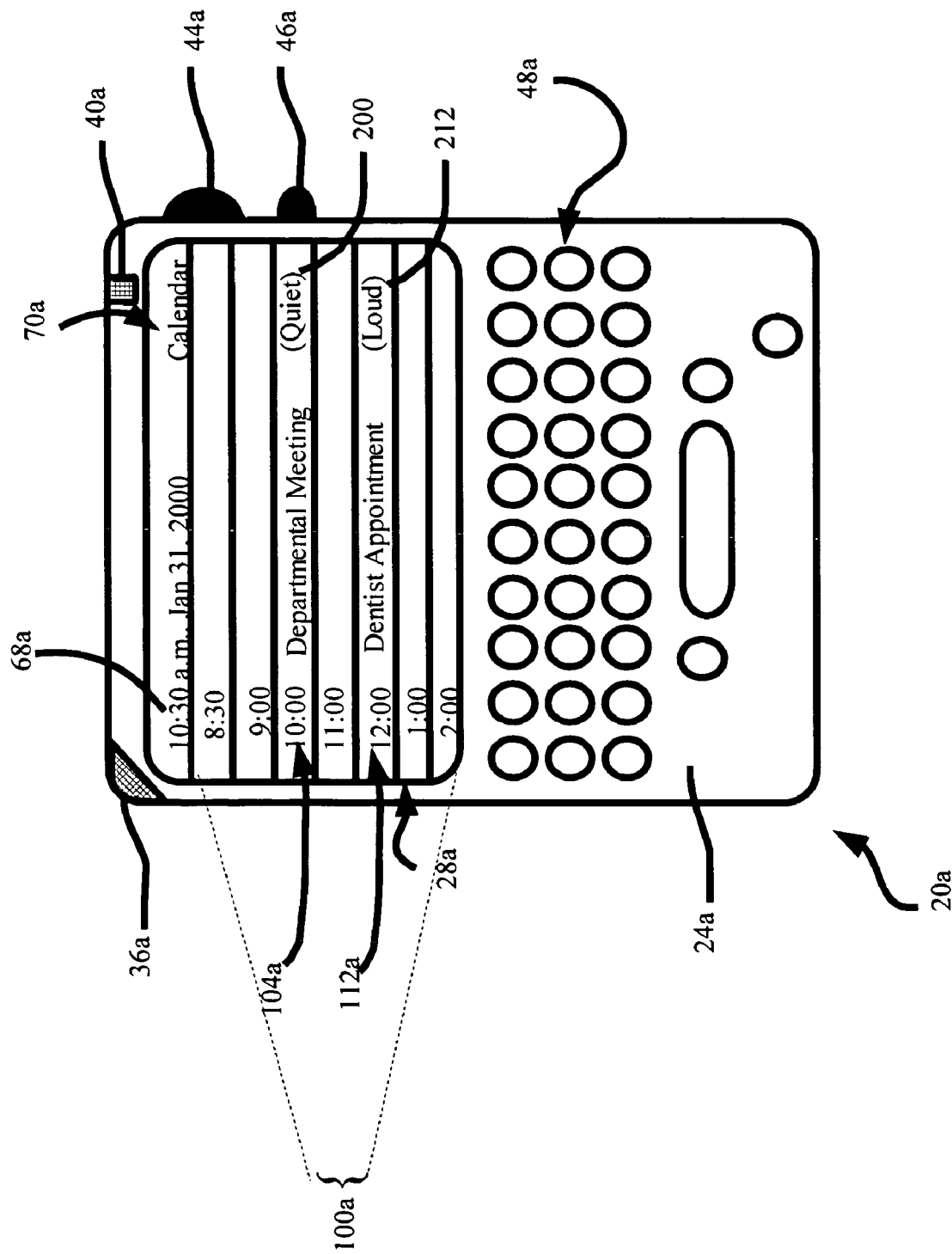
FIG. 17a shows the device of FIG. 17 with the calendar application displaying a plurality of individual appointments for the date of Jan. 31, 2000.

In operation, during appointment 104a, the profile Quiet 200 would be in effect. Referring now to FIG. 17a, the application calendar 70a has a series of appointments 100a. Appointment 104a is associated with the profile Quiet 200, and appointment 112a is associated with the profile Loud 212. It should now be apparent that whereas in device 20, each calendar appointment 100 had either a "speaker icon" 108 or a "no-speaker icon" 114 associated with it, in device 20a, each appointment, can have a particular profile 110a associated with it, instead. This is illustrated in FIG. 17a, where appointment 104a is associated with the profile Quiet 200 and appointment 112a is associated with the profile Loud 212.

It will be apparent to those skilled in the art that Table I is just one example of the way in which notifications can be customized. Furthermore, the specific types, tunes and volumes outlined in Table I are not particularly limited. Also the list of specific applications associated with each mode is not particularly limited and can match the complete set of applications on device 20a.

As seen in Table I, if message reader 82a was to receive an email during appointment 104a which is associated with the profile Quiet, the output notification would be inaudible, with no tune or volume and light would emanate from LED indicator 40a. Similarly, if daily alarm 86a was to go off during appointment 104a, the output notification would be a low volume sound corresponding to a tune called "ring 2", emanating from speaker 36a.

Figure 18:
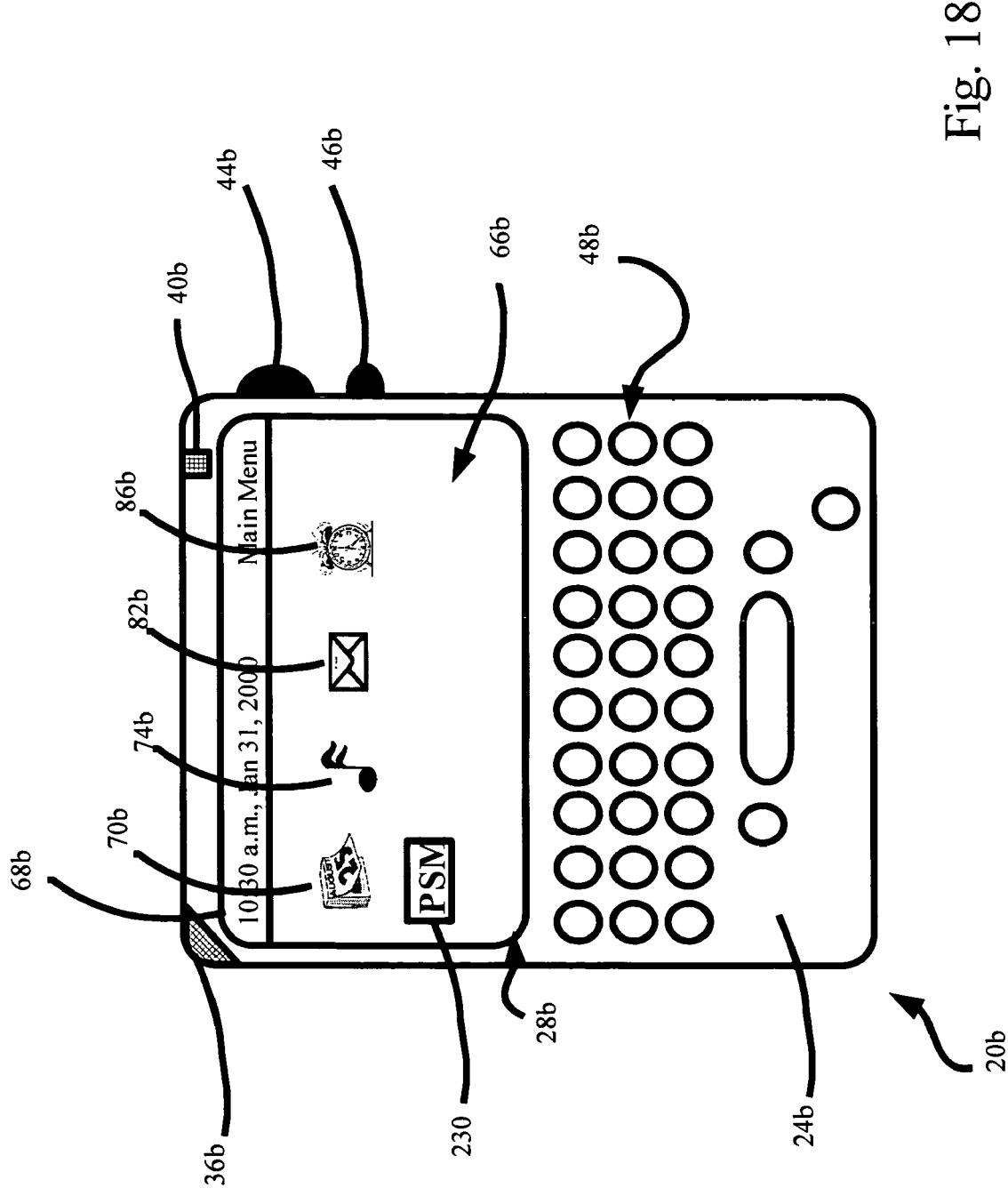
FIG. 18 is a schematic representation of yet another embodiment with the main menu screen displaying a plurality of applications including an application called profile string matcher, as well as the calendar, notification setup, message reader and daily alarm applications.

In another embodiment, and referring now to FIG. 18, an electronic device for modifying notifications in accordance with another embodiment is indicated generally at 20b. Device 20b is substantially the same as device 20a and like elements of device 20a and device 20b will bear the same reference characters, but followed by the suffix "b" instead of suffix "a". In FIG. 18, device 20b is shown with a main menu screen 66b, displaying an application called profile string matcher 230, as well as calendar 70b, notification setup 74b, message reader 82b and daily alarm 86b.

Figure 19:
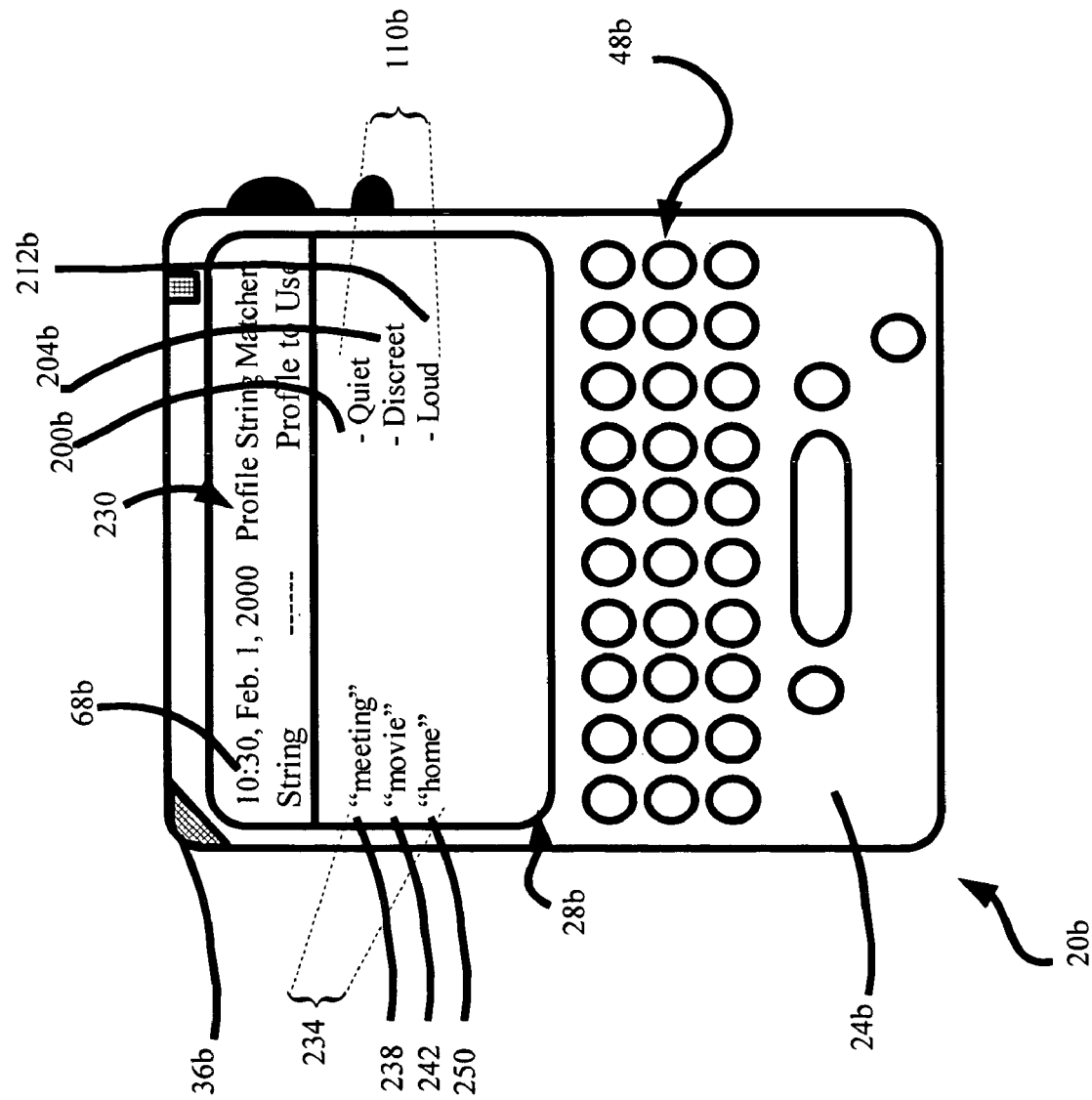
FIG. 19 shows the device of FIG. 18, with the profile string matcher application displaying a plurality of strings, each associated with a different mode of notification.

Referring now to FIG. 19, device 20b is shown displaying a list of strings 234, associated with a different notification profile 110b, using the application called profile string matcher 230. List 234 contains a plurality of individual strings 238, 242 and 250, each associated with a notification profile 110b. As illustrated in FIG. 19 string 238 is the word "meeting" and is associated with the profile "Quiet" 200b. String 242 is the word "movie" and is associated with the profile "Discreet" 204b. Finally string 250 is the word "home" and is associated with the profile "Loud" 212b.

Figure 20:
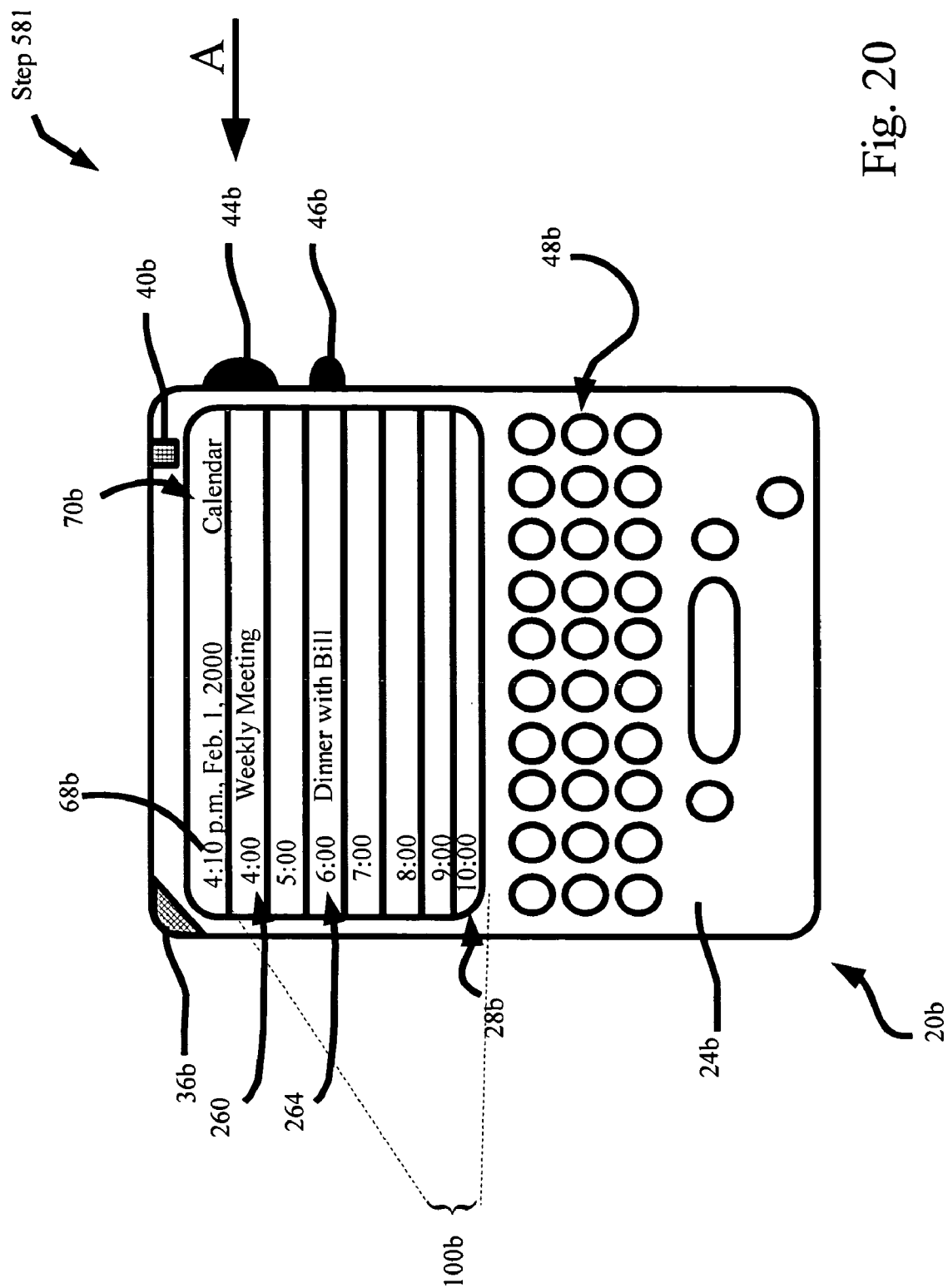
FIG. 20 shows the device of FIG. 18, with the calendar application displaying a plurality of individual appointments for Feb. 1, 2000.

Referring now to FIG. 20, device 20b is shown displaying the day's schedule 100b for Feb. 1, 2000 using the application called calendar 70b on display 28b. Schedule 100b includes a plurality of individual appointments 260 and 264. As illustrated in FIG. 20, appointment 260 is "weekly meeting", from 4:00-5:00 p.m., and appointment 264 is "dinner with Bill", from 6:00-7:00 p.m. Calendar 70b also displays a clock 68b that shows the current date and time.

A method for modifying notifications in accordance with another embodiment will now be discussed with reference to the flow chart shown in FIG. 21 and is indicated generally at 500b. In order to assist in the explanation of method 500b, reference will be made to the foregoing discussion of device 20b. In order to further assist in the explanation of method 500b, the sequence of steps in method 500b shall be followed in connection to a series of examples using device 20b. In these examples, it will be assumed that device 20b receives a series of emails at different times during the day.

Figure 21:
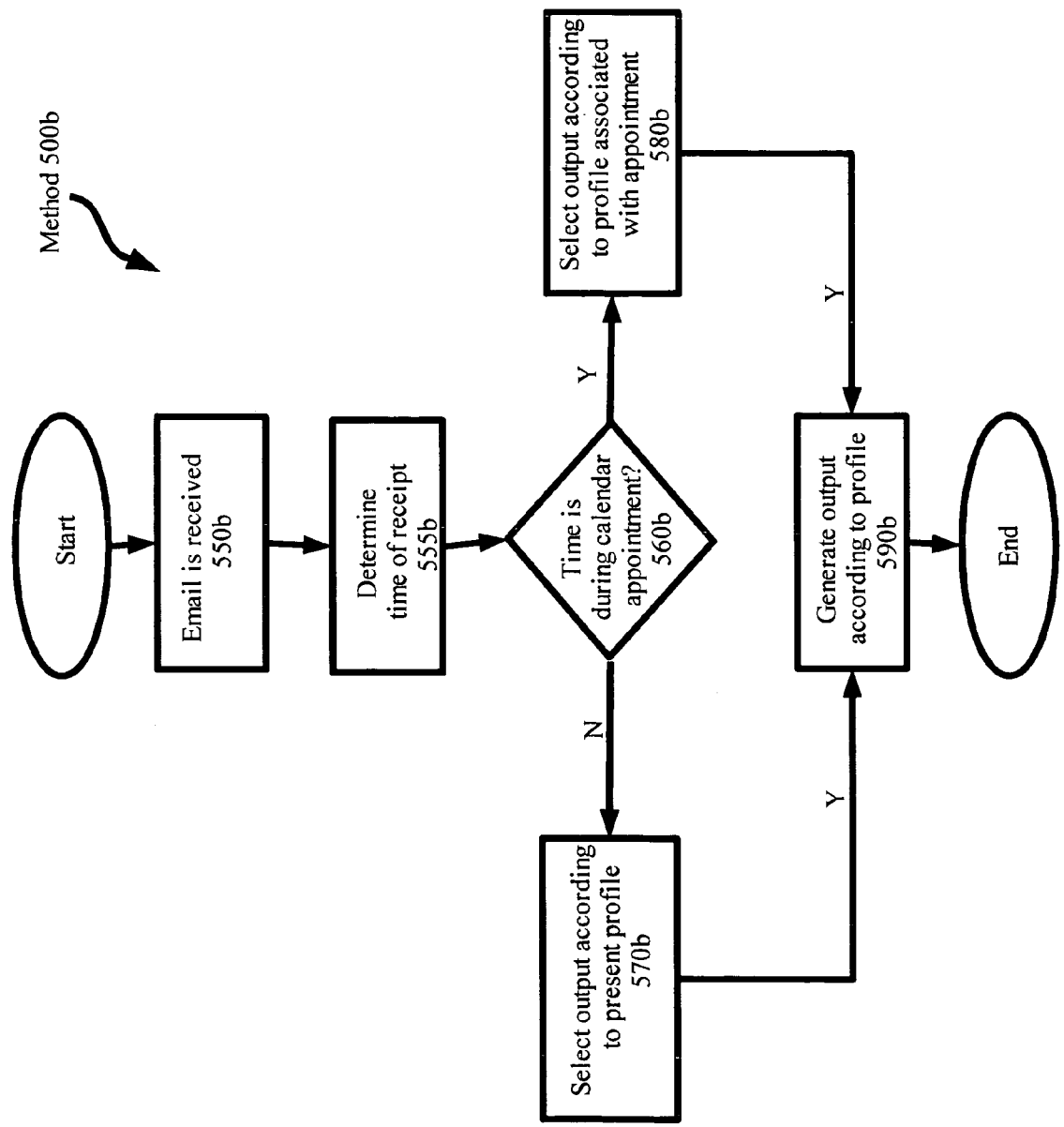
FIG. 21 shows a flow chart depicting a method for modifying notification settings in accordance with another embodiment.
Figure 22:
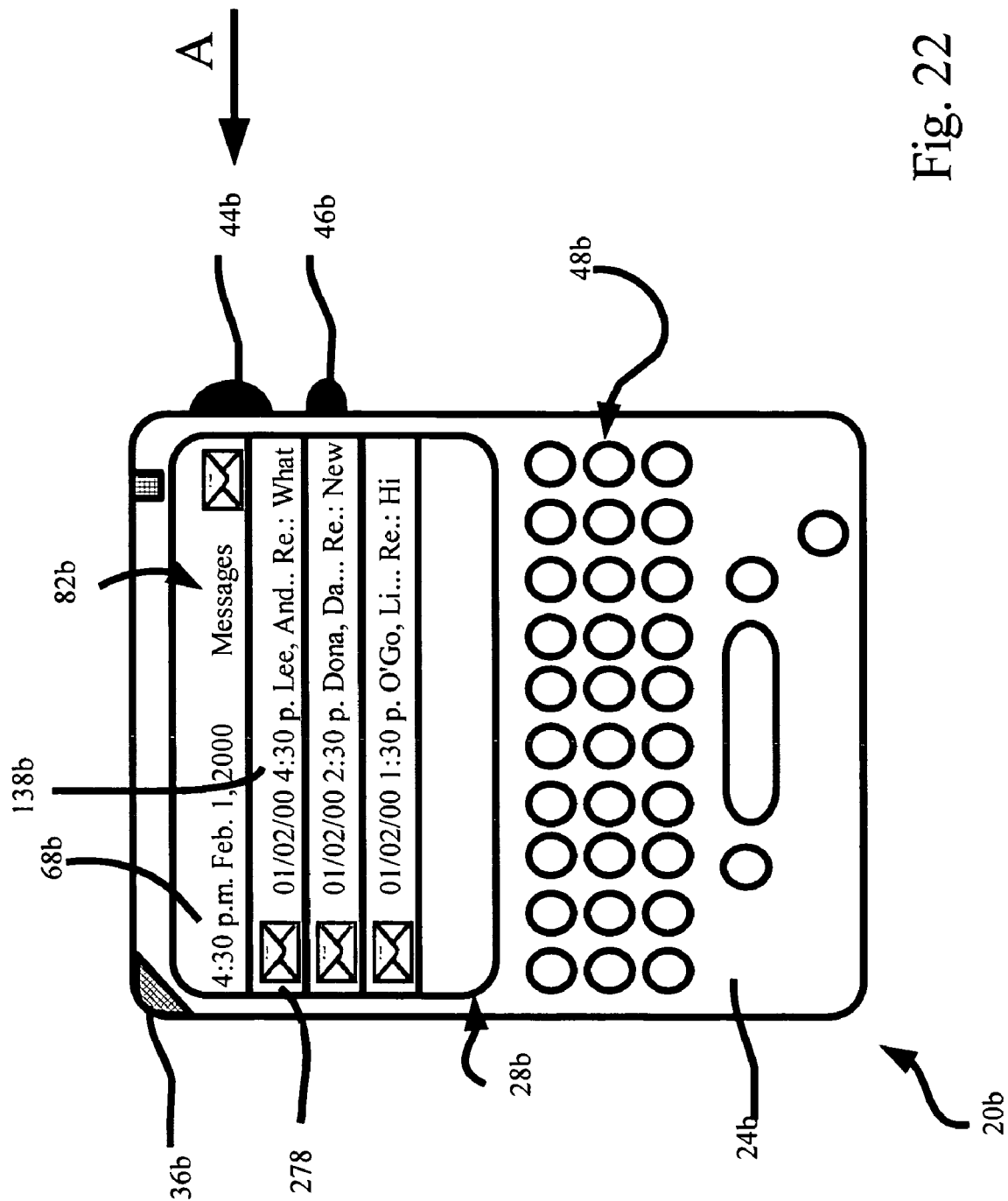
FIG. 22 shows the device of FIG. 18 with the message reader application having received a new email at 4:30 p.m. on Feb. 1, 2000.

As demonstrated in the flow chart in FIG. 21, emails are received by device 20b at step 550b. In one example, and referring now to FIG. 22, it is to be assumed that one of the emails received by device 20a is email 278. Email 278 is sent by Andrea Lee at 4:30 p.m. on Feb. 1, 2000 and is not marked urgent. At step 555b, the time of receipt 138b of the information is determined. Referring now to FIG. 22, time of receipt 138b of email 278 is determined to be 4:30 p.m. At this point, the method advances to step 560b where it is determined whether time of receipt 138b is during any of the appointments marked in calendar 70b. If time of receipt 138b is during one of such appointments, the method then advances to step 580b. However, if time of receipt 138b is not during any of these appointments, the method advances to step 570b. In connection with email 278, and referring now to FIG. 23, it is determined that time of receipt 138b is during appointment 260. The method, thus, advances to step 580b. At step 580b, the mode of notification according to a profile selected from notification setup 74b is determined.

Figure 24:
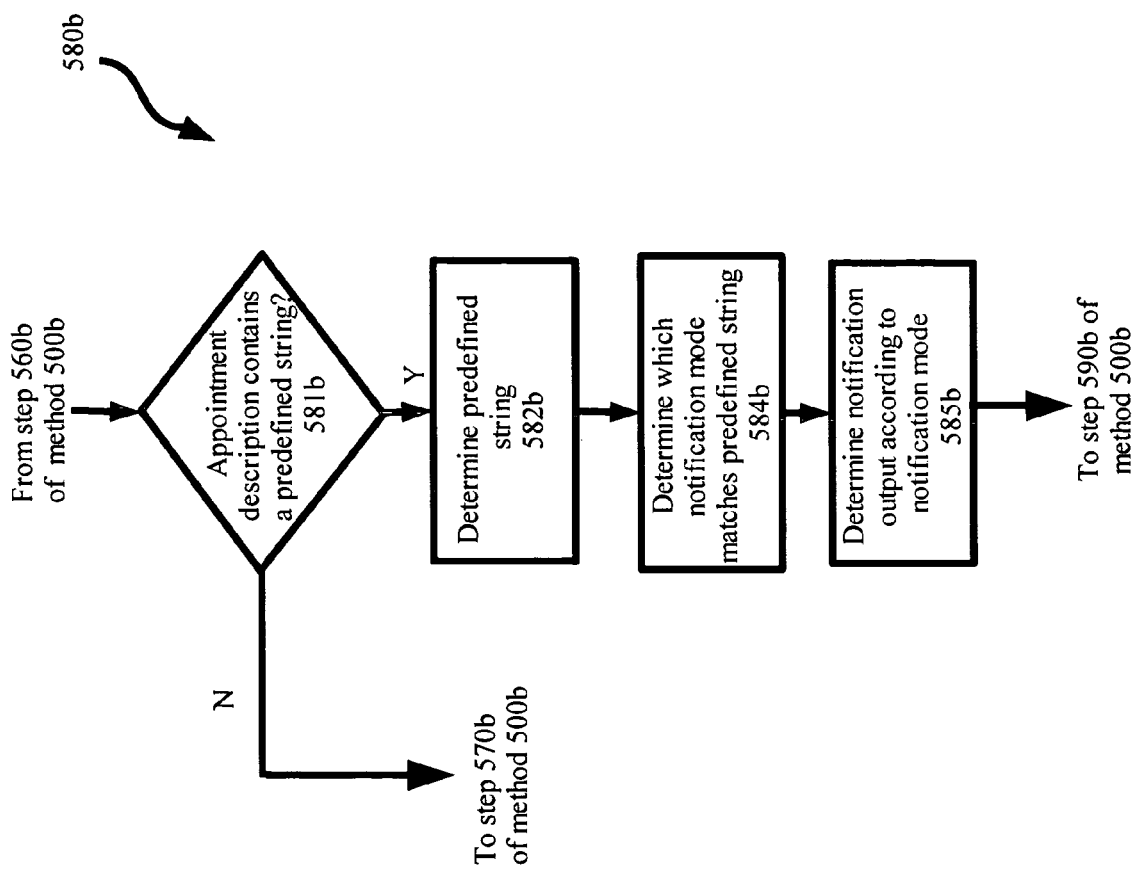
FIG. 24 shows a flow chart depicting a set of substeps that can be used to perform one of the steps shown in FIG. 21.

Step 580b "select output according to profile associated with appointment" of method 500b can be performed in a variety of ways, one example of which is demonstrated in a number of sub-steps in FIG. 24. At step 581b, it is determined whether the appointment, with which time of receipt 138b is associated, includes any of the strings on list 234 of profile string matcher 230, outlined in FIG. 19. If the description of the appointment includes one of the strings on list 234, the method advances to step 582b, where the type of notification corresponding to the matched string is determined. If, on the other hand, the description of the appointment does not include one of the strings on list 234, the method advanced to step 570b, where the mode of notification is defined according to the default mode of notification per notification setup 74b.

Figure 23:
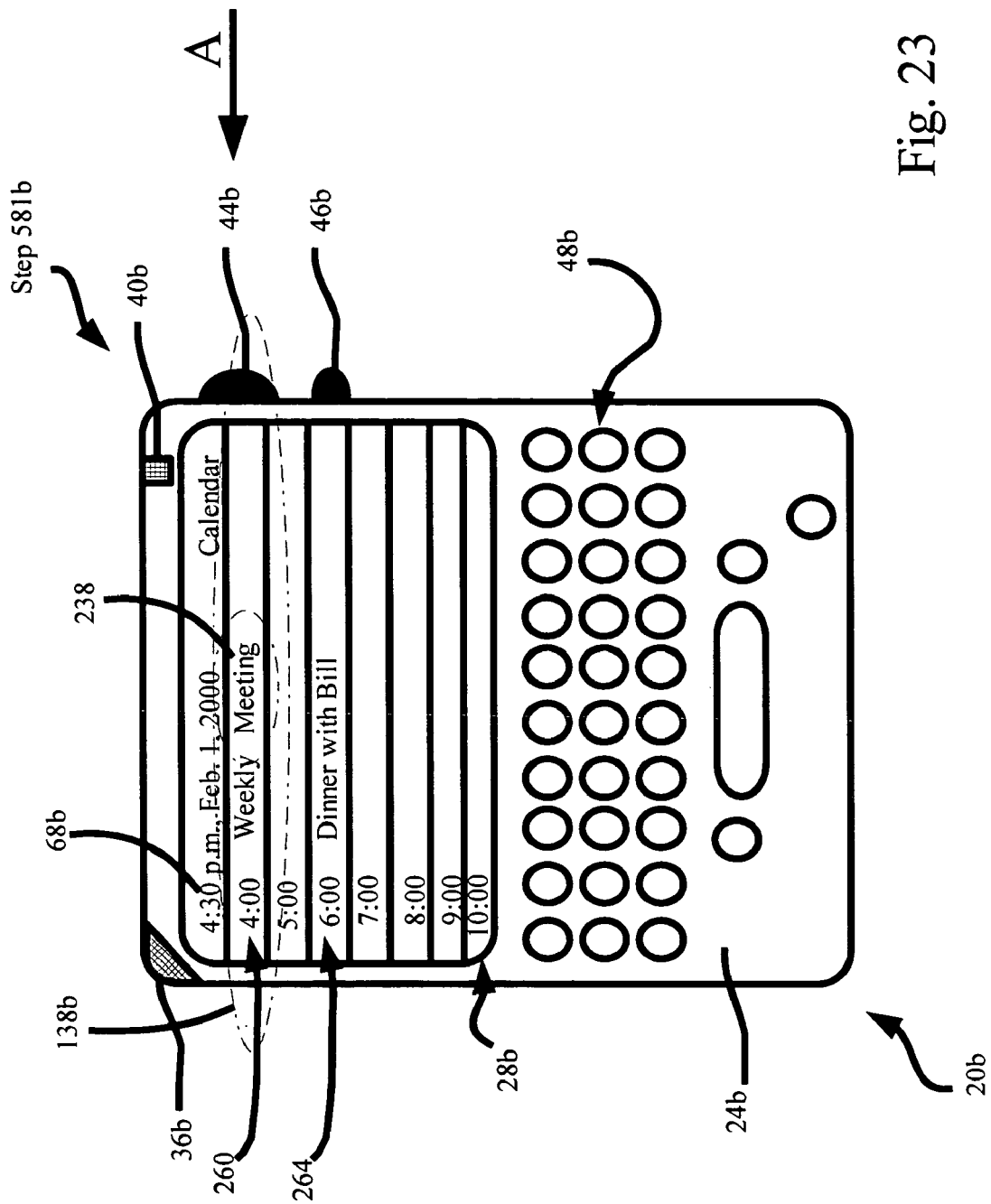
FIG. 23 shows the device of FIG. 18 with the calendar application, showing that the description of the appointment at 4:30 p.m. includes the word "meeting"
Figure 25:
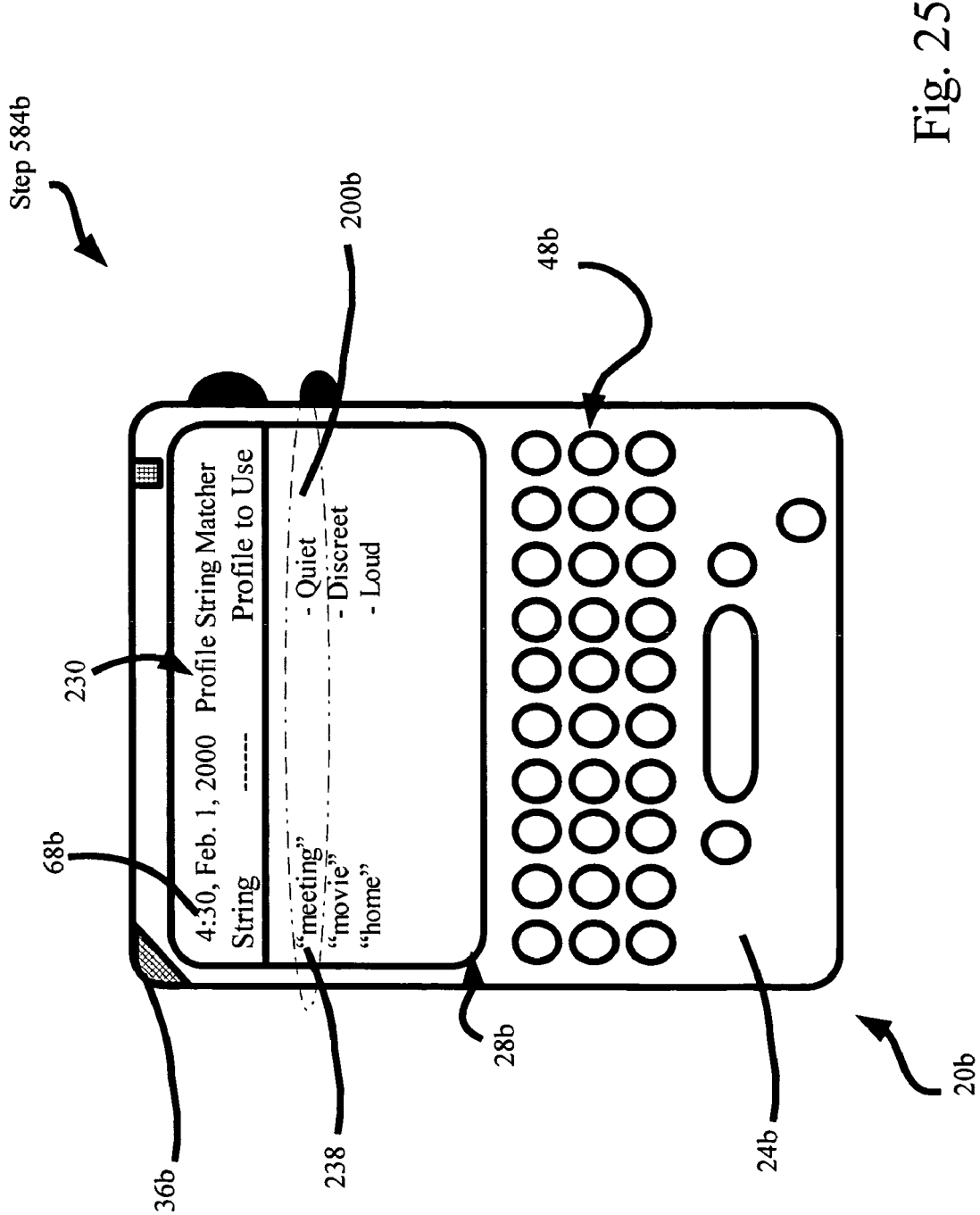
FIG. 25 shows the device of FIG. 18 with the profile string matcher application showing that the string "meeting" is associated with the profile "Quiet".

Referring now back to FIG. 23, at step 581b, it is determined that the description of appointment 260 includes one of the strings on list 234. The method then advances to step 582b where "weekly meeting" contains the word "meeting", which matches string 238. The method then advances to step 584b where, referring now to FIG. 25, it is determined that the notification profile associated with string 238 is the profile Quiet 200b. Once the notification profile is determined, the method then advances to step 585b where notification behavior is determined. For the purposes of this example, it is assumed that the modes of notification in this embodiment have been defined in accordance with Table I. In the case of the profile Quiet 200b, when there is an email received by message reader 82b, the notification is described as inaudible, with no tune or volume. Accordingly, at step 590b light emanates from LED indicator 40, indicating the receipt of email 278. Method 500b then ends.

Figure 26:
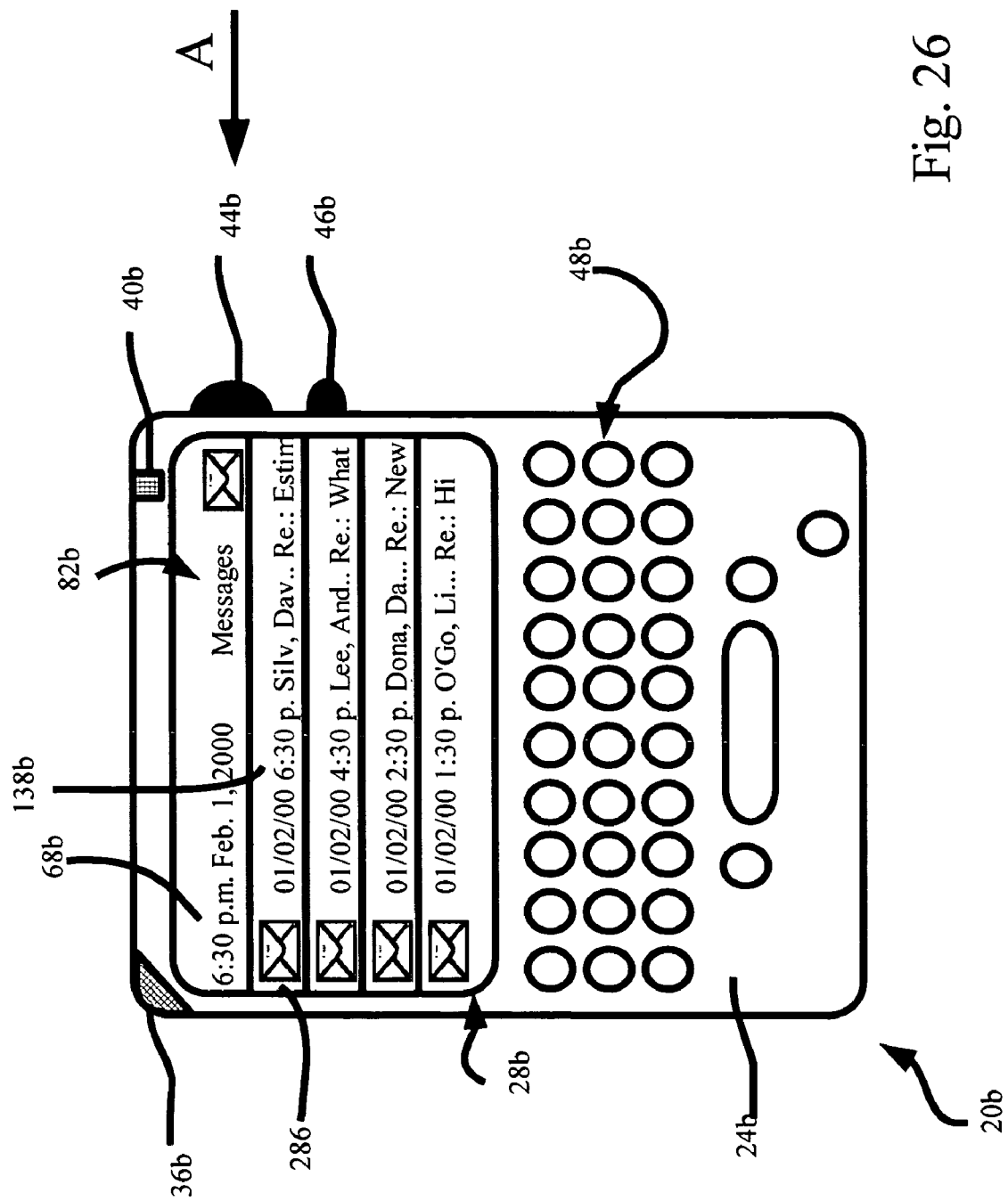
FIG. 26 shows the device of FIG. 18 with the message reader application having received a new email at 6:30 p.m. on Feb. 1, 2000.
Figure 27:
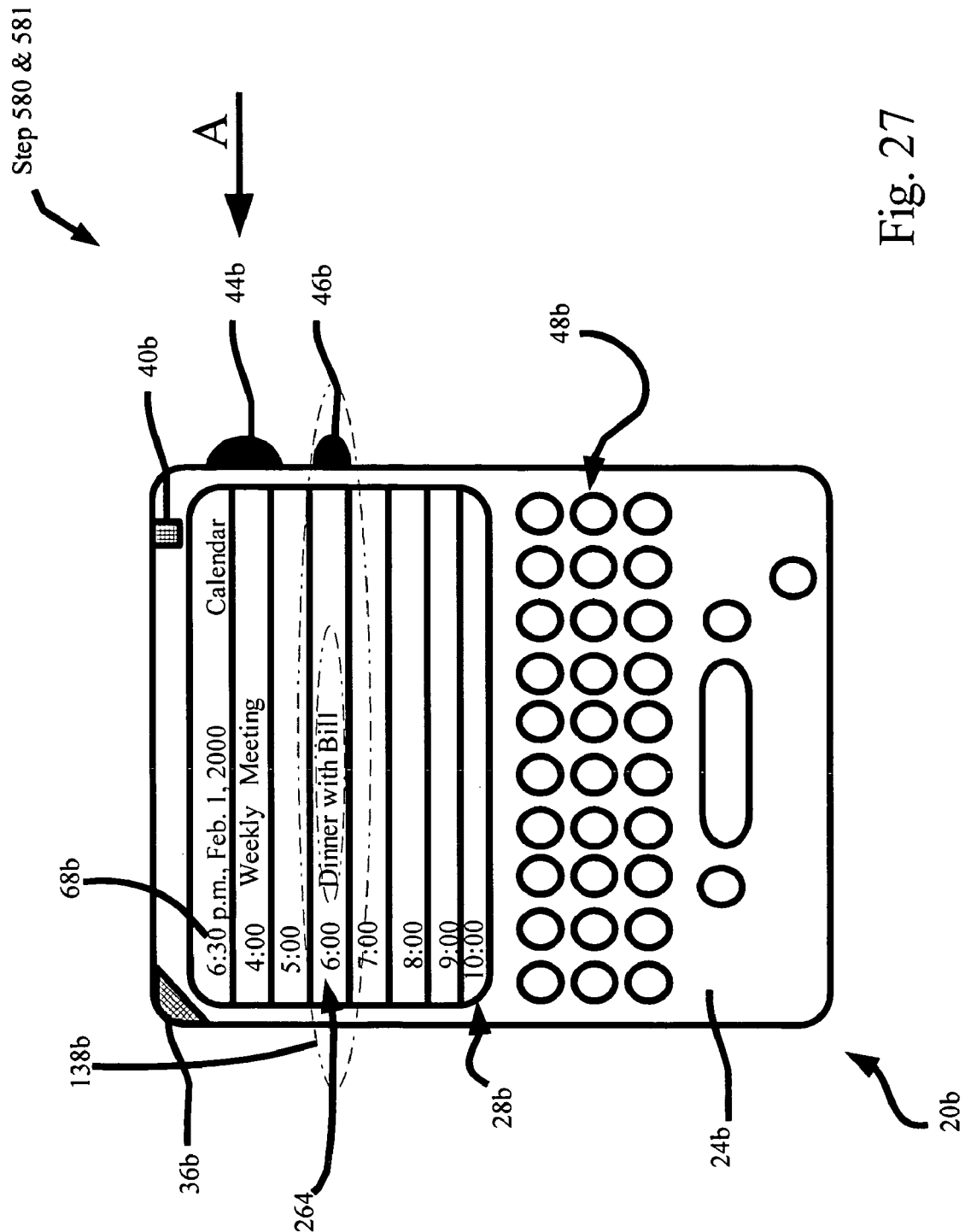
FIG. 27 shows the device of FIG. 18 with the calendar application showing that at 6:30 p.m. the user is scheduled to have dinner with Bill.

Method 500b will thus operate according to the receipt of different emails and during different appointments. For example, and referring now to FIGS. 26 and 27, it will be assumed that device 20b receives email 286 at 6:30 pm, which is during appointment 264. Since appointment 264 does not contain any of the strings on list 234, then during the performance of method 500b the method will advance to step 570b and device 20b will rely on the default notification profile established according to notification setup 74b. Assuming that notification setup 74b is similar to notification setup 74a and is set to the profile Discreet 204 as illustrated in FIG. 17, the method advances to step 590b where device 20b generates output according to specifications of the profile Discreet 204 in Table I and results in a flashing of light from LED indicator 40 and a medium volume sound corresponding to a tune called "ring 3" from speaker 36.

Figure 28:
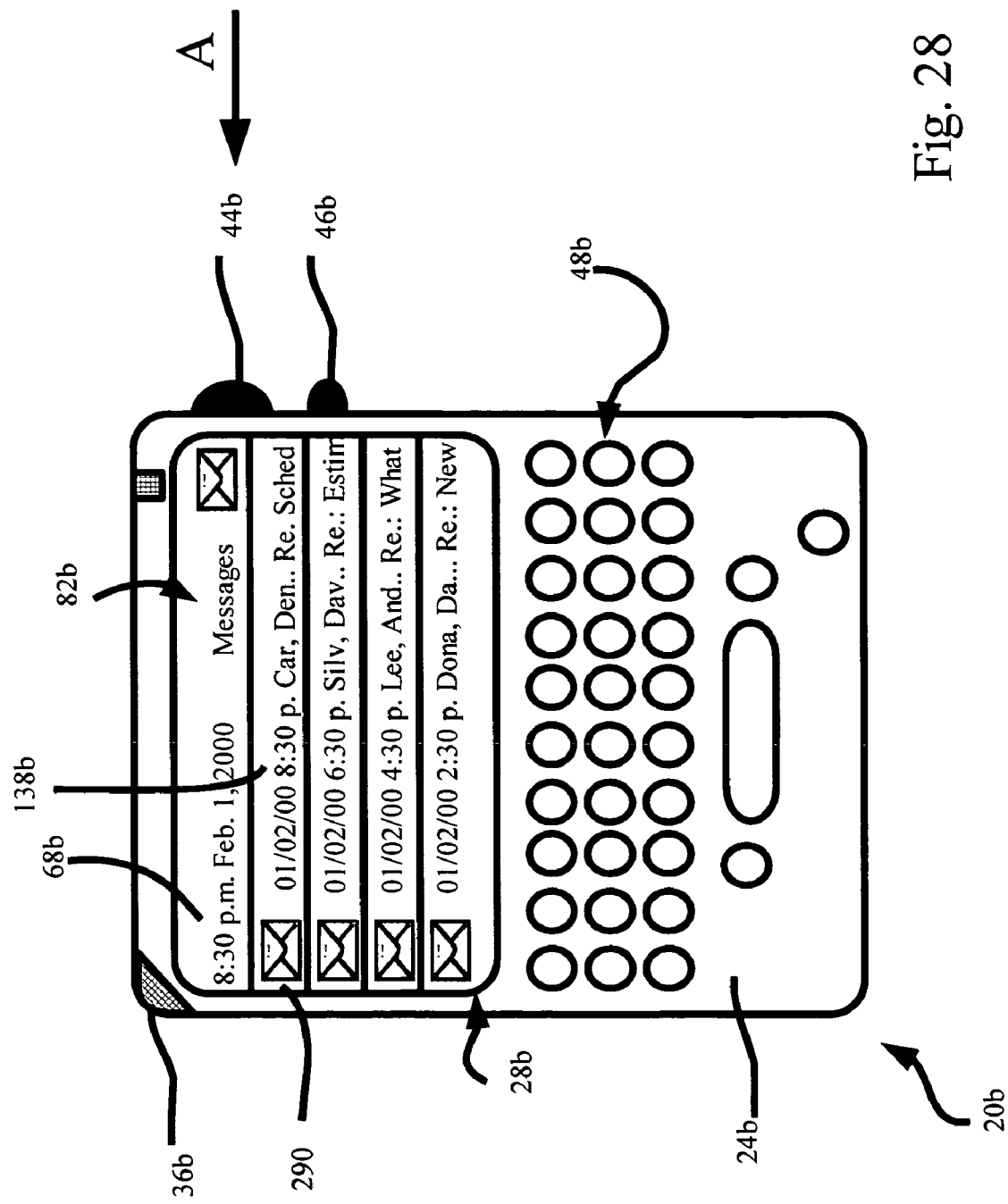
FIG. 28 shows the device of FIG. 18 with the message reader application having received a new email at 8:30 p.m.
Figure 29:
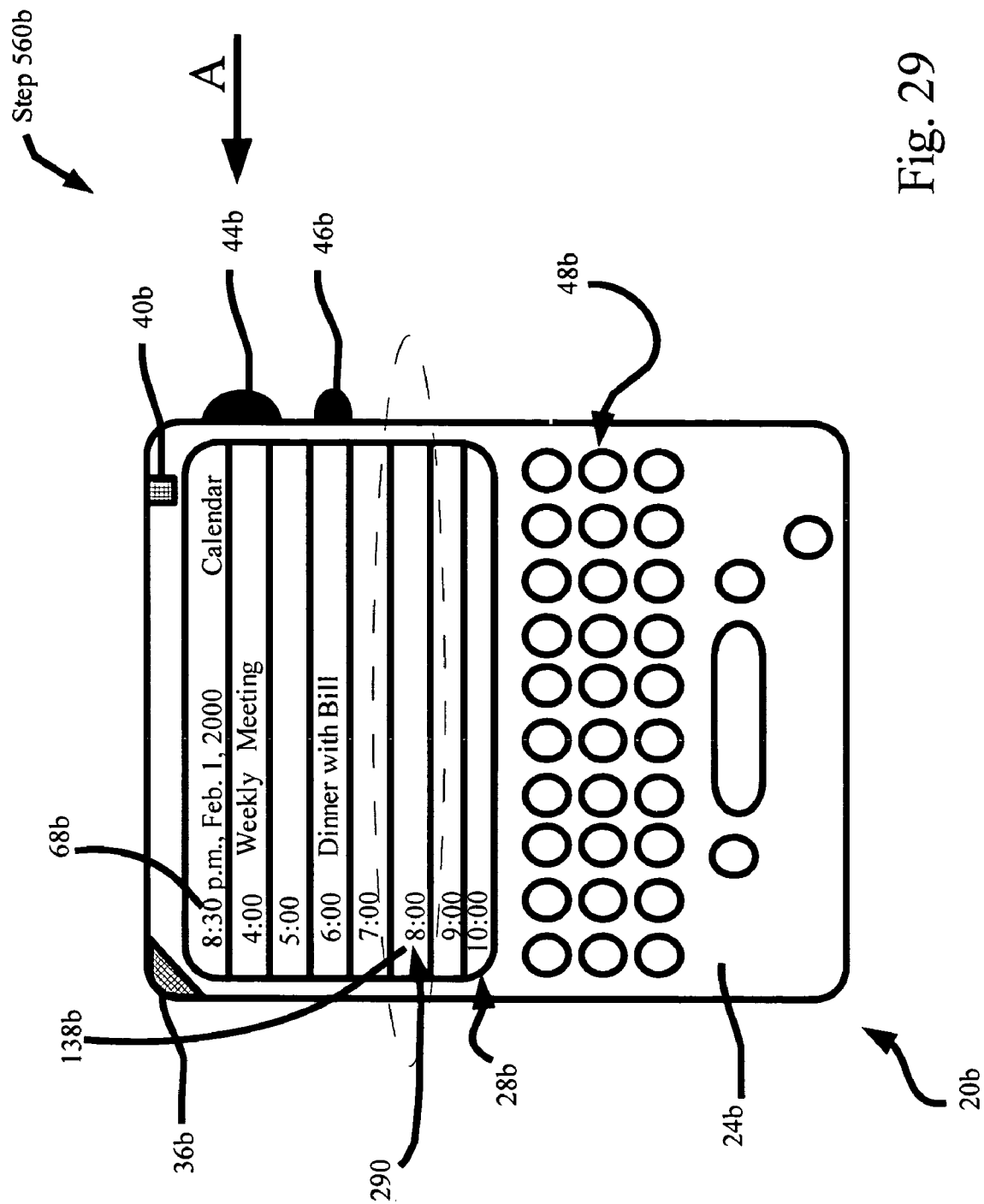
FIG. 29 shows the device of FIG. 18 with the calendar application having no appointments scheduled at 8:30 p.m.

To further illustrate, and referring now to FIGS. 28 and 29, it is assumed that device 20b receives yet another email 290 at 8:30 p.m., which is not during any of the appointments in schedule 100b. By now it should be apparent to the reader that, devise 20b would go through each of steps 550b to 560b of method 500b to determine that time of receipt 8:30 is not during any of the appointments in calendar 70b. The method would then advance to step 570 where output is selected according to the profile selected in notification setup 74b. Assuming as we did before that notification setup 74b is similar to and is set up as in notification setup 74a, the receipt of email 290 results in a flashing of light from LED indicator 40 and a medium volume sound corresponding to a tune called "ring 3" from speaker 36.

In general it should now be apparent that instead of a user specifically having to configure a different notification for every individual appointment or for every criteria within that individual appointment, rules can be established by a user, or the manufacturer of the device, such that the device recognizes certain keywords or strings within the description of the individual appointment, and/or within the description of information received by the device and signals a particular method of notification. For example the electronic device can be configured to be silent during all appointments that contain the word "business meeting" or "movies" and to signal/beep quietly when the appointment is over. At the same time, it could, also, be configured to vibrate if the information received is an email or voicemail marked urgent within any appointments which contain the words "business meeting" or "movies" in the description of the appointment.

While the embodiments discussed herein are directed to specific embodiments, it will be understood that subsets and variations of the embodiments are within the scope of the invention. For example, it is to be understood that the receiving of emails is merely an example of an application that can generate a notification. Other examples of information that can be received by a device include, telephone calls, faxes, voice-mail messages, notification of appointments, daily alarm notifications, warning messages from the device in connection to its operation, such as "low battery" messages, or any other set of information for which a notification may be of use.

It is also contemplated that notifications can consist of a variety of audible, inaudible, vibrating and combinations of audible, inaudible and vibrating modes of notification. Audible modes of notification can include software sounds with a plurality of different frequencies and pitch. They can consist of different melodies and songs or they can be connected to the radio amongst many other possibilities. Similarly inaudible modes of notification include a variety of possibilities, such as a plurality of vibrations with varying intensities, plurality of colors of flashing and non-flashing lights and pop-up screens on the displays of computers, cell phones, personal digital assistants and etc. The different modes of notification, or combinations thereof can be predefined by the manufacturer of the electronic device or arbitrarily selected and added on by the user.

It is also contemplated that an electronic device can be configured to use different modes of notification depending on a variety of criteria. For example an electronic device can be configured to have one mode of notification if emails are received during a particular calendar event and a second mode of notification if the alarm goes off or a voice mail is received during the same calendar event. An electronic device could be further configured to have a different mode of notification if the email or voicemail is marked urgent or if the voice mail is from a certain person or area code. An electronic device could be configured to simply shut off all modes of notification during certain appointments and/or it could be configured to notify the user of receiving the information after the appointment is over. In general, an electronic device could be configured to have different modes of notification for different calendar events and even within each calendar event, the electronic device can be configured to have different modes of notification based on a plurality of other criteria, such as the type of information received, when and during which calendar event the information was received, by whom the information was received, whether the information was marked urgent or whether the information was received with certain other attributes.

In general, it is contemplated that rules can be established based on any type of information related to an individual appointment or information received by the device. For example, the electronic device can be configured to vibrate softly during all appointments between 6:00 p.m. to 10:00 p.m. and to be silent regardless of what type of information is received between 10:00 p.m. to 8:00 a.m., unless the information is a long distant phone call from a predefined person, in which case the device could ring loudly.

It is also contemplated that the device could change its method of notification based on the physical orientation of the device, such as whether it has a clamp shell that is opened or closed or whether it is being placed on a user's belt or on a device crib. For example, a device could be configured to vibrate softly if the device is out of the cradle and to have the LED indicator flashing when the device is in the cradle.

The invention claimed is:

1. An electronic device comprising:
   at least one output device for emitting a plurality of different signals;
   a microcomputer for processing a plurality of calendar appointments within a calendar application; said microcomputer further configured for processing a plurality of applications; said microcomputer configured to maintain a plurality of profiles; each of said calendar appointments configured to have a different profile associated therewith; each of said profiles associated with all of said applications; each of said applications within each of said profiles having a plurality of notification behaviours; each of said notification behaviours having an identical set of parameters for each of said applications; each of said notification behaviours uniquely configurable for each said application and each said profile;
   said microcomputer configured to maintain a profile settings application; said profile settings application configured to receive user input for setting said notification behaviours for each of said applications for each said profile according to criteria comprised of type, tune and volume; said profile settings application including a profile string matcher; said profile string matcher configured to comprise a string of text and associate said string of text with one of said profiles; wherein at least one of said calendar appointments is configured to have a profile associated therewith based on a match between a description of said at least one calendar appointment and said string of text within said profile string matcher; wherein in the absence of a match between said description and said string of text, said calendar appointment is configured to have a default profile associated therewith;
   said microcomputer configured to derive one of said notification behaviours when one of said applications executes during one of said plurality of calendar appointments; said notification behaviour derived from said associated profile;
   said microcomputer configured to cause said output device to emit one of said signals corresponding to said notification behaviour derived from said associated profile.

2. The electronic device of claim 1 wherein said device is selected from the group consisting of a wireless personal digital assistant, a personal computer, a cell telephone, and a smart telephone.

3. The electronic device of claim 1 wherein said signals are selected from the group consisting of audible, mechanical and visual signals.

4. The electronic device of claim 1 wherein said one of said applications is a receipt of an electronic message and said signal identifies said receipt.

5. The electronic device of claim 1 wherein said one of said applications is a daily alarm and said signal identifies said alarm.

6. The electronic device of claim 1 wherein said electronic device includes functionality of a telephone and one of said plurality of applications is a receipt of a telephone call.

7. The electronic device of claim 1 wherein said output devices include a flashing LED output device for emitting a visual signal and a speaker for emitting an audible signal.

8. A computer-readable storage medium containing a set of instructions for an electronic device, said set of instructions for controlling said electronic device by comprising the method of:

maintaining a plurality of profiles;

processing a plurality of calendar appointments within a calendar application;

performing one of a plurality of applications during one of said plurality of calendar appointments; each of said calendar appointments configured to have a different profile associated therewith; each of said profiles associated with all of said applications; each of said applications within each of said profiles having a plurality of notification behaviours; each of said notification behaviours having an identical set of parameters for each of said applications; each of said notification behaviours uniquely configurable for each said application and each said profile;

maintaining a profile settings application; said profile settings application configured to maintain said notification behaviours for each of said applications for each said profile according to criteria comprised of type, tune and volume; said profile settings application including a profile string matcher; said profile string matcher configured to comprise a string of text; said string of text associated with one of said profiles; at least one of said calendar appointments configurable to have a profile associated therewith based on a match between a description of said at least one calendar appointment and said string of text within said profile string matcher; wherein in the absence of a match between said description and said string of text, said calendar appointment is configured to have a default profile associated therewith;

deriving a notification behaviour from said profile associated with the calendar appointment that is active when performing said application; and generating a signal according to said notification behaviour.

* * * * *